United States Patent
Xu et al.

(10) Patent No.: US 11,748,729 B2
(45) Date of Patent: *Sep. 5, 2023

(54) METHOD AND APPARATUS FOR VIDEO CODING

(71) Applicant: Tencent America LLC, Palo Alto, CA (US)

(72) Inventors: Xiaozhong Xu, State College, PA (US); Xiang Li, Saratoga, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 118 days.

This patent is subject to a terminal disclaimer.

(21) Appl. No.: 17/645,633

(22) Filed: Dec. 22, 2021

(65) Prior Publication Data

US 2022/0114568 A1    Apr. 14, 2022

Related U.S. Application Data

(63) Continuation of application No. 16/734,107, filed on Jan. 3, 2020, now Pat. No. 11,240,518.

(Continued)

(51) Int. Cl.
*G06Q 20/20*     (2012.01)
*G06Q 30/0601*   (2023.01)

(52) U.S. Cl.
CPC ....... *G06Q 20/207* (2013.01); *G06Q 30/0641* (2013.01); *G06Q 20/206* (2013.01)

(58) Field of Classification Search
CPC .. H04N 19/105; H04N 19/132; H04N 19/159; H04N 19/176; H04N 19/186;
(Continued)

(56) References Cited

U.S. PATENT DOCUMENTS

| 10,404,980 | B1 | 9/2019 | Zhao et al. |
| 2017/0994951 | | 4/2017 | Rapaka et al. |

(Continued)

FOREIGN PATENT DOCUMENTS

| WO | 2017/162912 A1 | 9/2017 |
| WO | 2017/190288 A1 | 11/2017 |
| WO | 2018/142903 A1 | 11/2018 |

OTHER PUBLICATIONS

International Search Report and Written Opinion Issued in Application PCT/US20/12308 dated Mar. 12, 2020.

(Continued)

*Primary Examiner* — Dakshesh D Parikh
(74) *Attorney, Agent, or Firm* — ARENTFOX SCHIFF LLP

(57) ABSTRACT

Aspects of the disclosure provide method and apparatus for video coding. In the method, which of a combination of vertical padding and horizontal padding is performed is determined to determine padded values of a reference block in a neighboring left coding tree unit (CTU) included in a fixed search range of blocks in a current CTU. The padded values are determined based on a block vector that points to the reference block and a position of a current block in the CTU. At least a sample of the current block is reconstructed based on one of (i) the padded values of the reference block and (ii) reconstructed samples of the reference block based on availability of the reference block in the fixed search range. The left CTU is padded using a combination of the vertical and the horizontal padding.

20 Claims, 25 Drawing Sheets

Related U.S. Application Data

(60) Provisional application No. 62/788,935, filed on Jan. 6, 2019.

(58) Field of Classification Search
CPC ...... H04N 19/423; H04N 19/44; H04N 19/11; H04N 19/563; H04N 19/593; H04N 19/96
See application file for complete search history.

(56) References Cited

U.S. PATENT DOCUMENTS

| | | | |
|---|---|---|---|
| 2019/0141318 A1 | 5/2019 | Li et al. | |
| 2019/0394465 A1* | 12/2019 | Moon | H04N 19/105 |
| 2020/0204819 A1* | 6/2020 | Hsieh | H04N 19/105 |

OTHER PUBLICATIONS

Supplementary European Search Report dated Sep. 6, 2022 in Application No. 20736186.6. (10 pages).

Pham Van L et al: "CE8-related: Virtual search area for current picture referencing (CPR)", 13. JVET Meeting Jan. 9, 2019-Jan. 18, 2019; Marrakech; (The Joint Video Exploration Team of ISO/IEC JTC1/SC29/WG11 and ITU-T SG.16), No. JVET-M0151, Jan. 1, 2019, pp. 1-6.

Xu X et al: "CE8: CPR reference memory reuse without increasing memory requirement (CE8.1.2a and CE8.1.2d)", 13. JVET Meeting; Jan. 9, 2019-Jan. 18, 2019; Marrakech; (The Joint Video Exploration Team of ISO/IEC JTC1/SC29/WG11 and ITU-T SG.16 ), No. JVET-M0407, Jan. 3, 2019, pp. 1-9.

Xu X et al: "CE8: CPR reference memory reuse with reduced memory requirement (CE8.1.2b and CE8.1.2c)", 13. JVET Meeting; Jan. 9, 2019-Jan. 18, 2019; Marrakech; (The Joint Video Exploration Team of ISO/IEC JTC1/SC29/WG11 and ITU-T SG.16 ), No. JVET-M0408, Jan. 3, 2019, pp. 1-10.

Xu X et al: "On chroma motion vector derivation for intra block copy", 21. JCT-VC Meeting; Jun. 19, 2015-Jun. 26, 2015; Warsaw; (Joint Collaborative Team on Video Coding of ISO/IEC JTC1/SC29/WG11 and ITU-T SG.16 ); No. JCTVC-U0077-v3,Jun. 19, 2015, pp. 1-10.

* cited by examiner

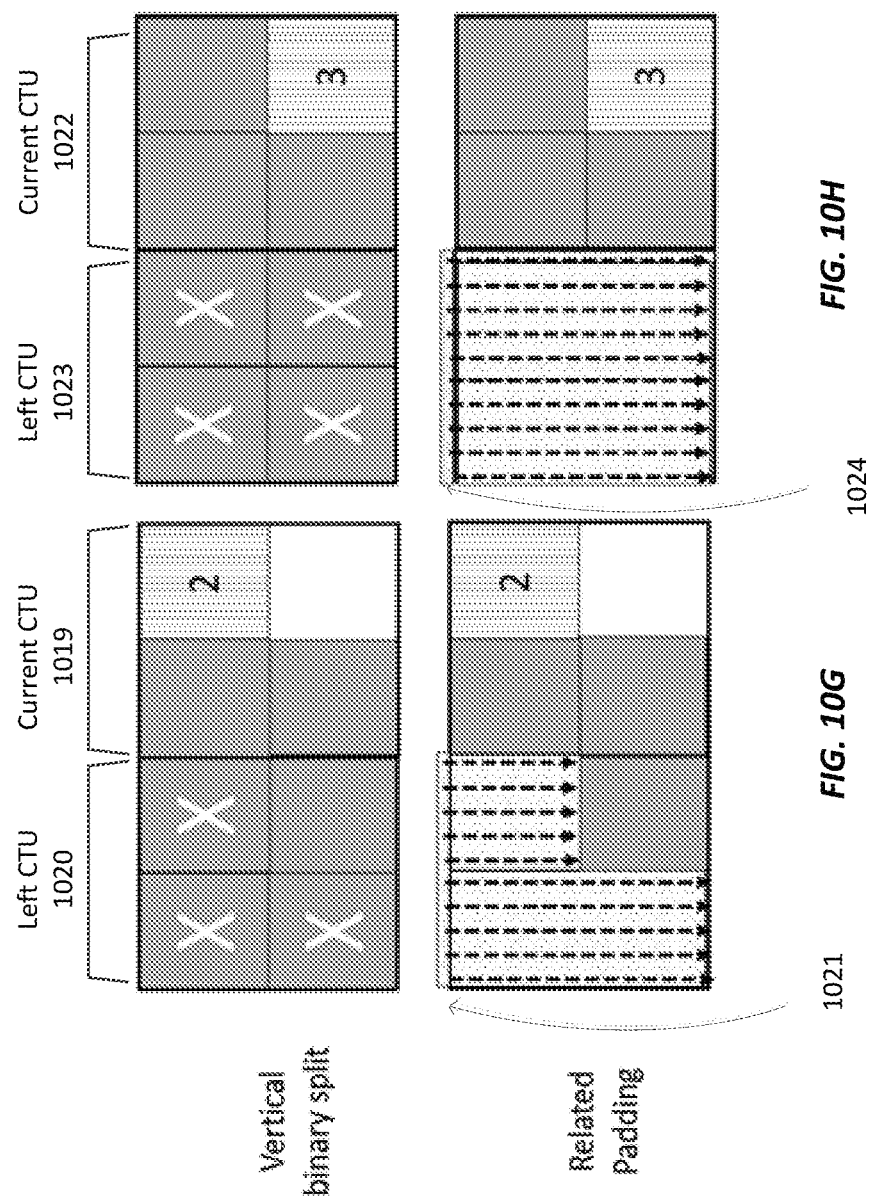

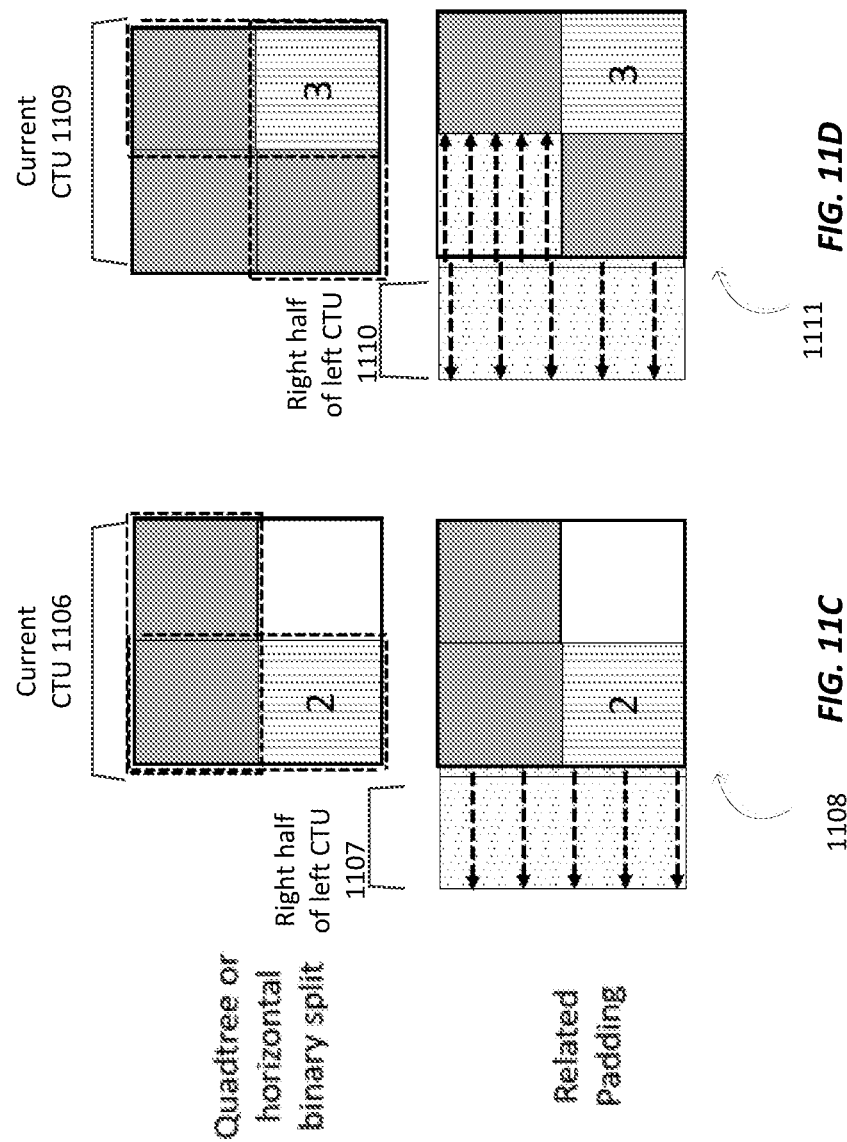

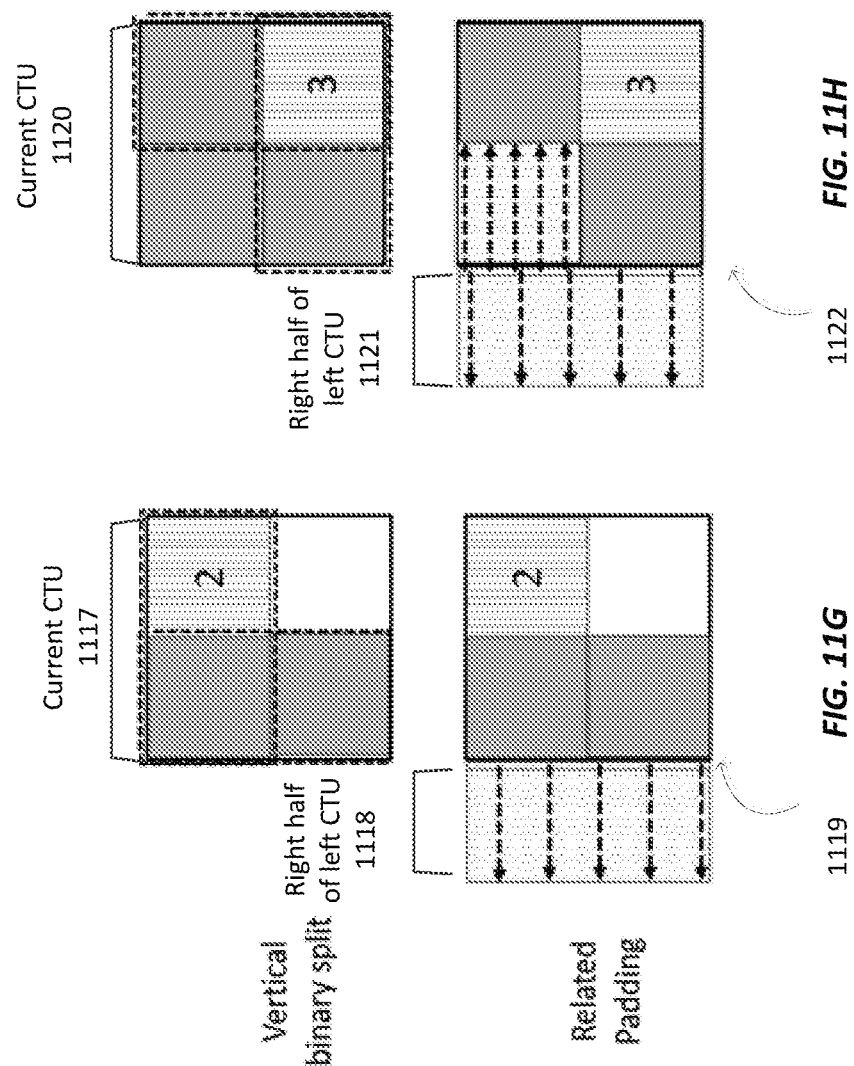

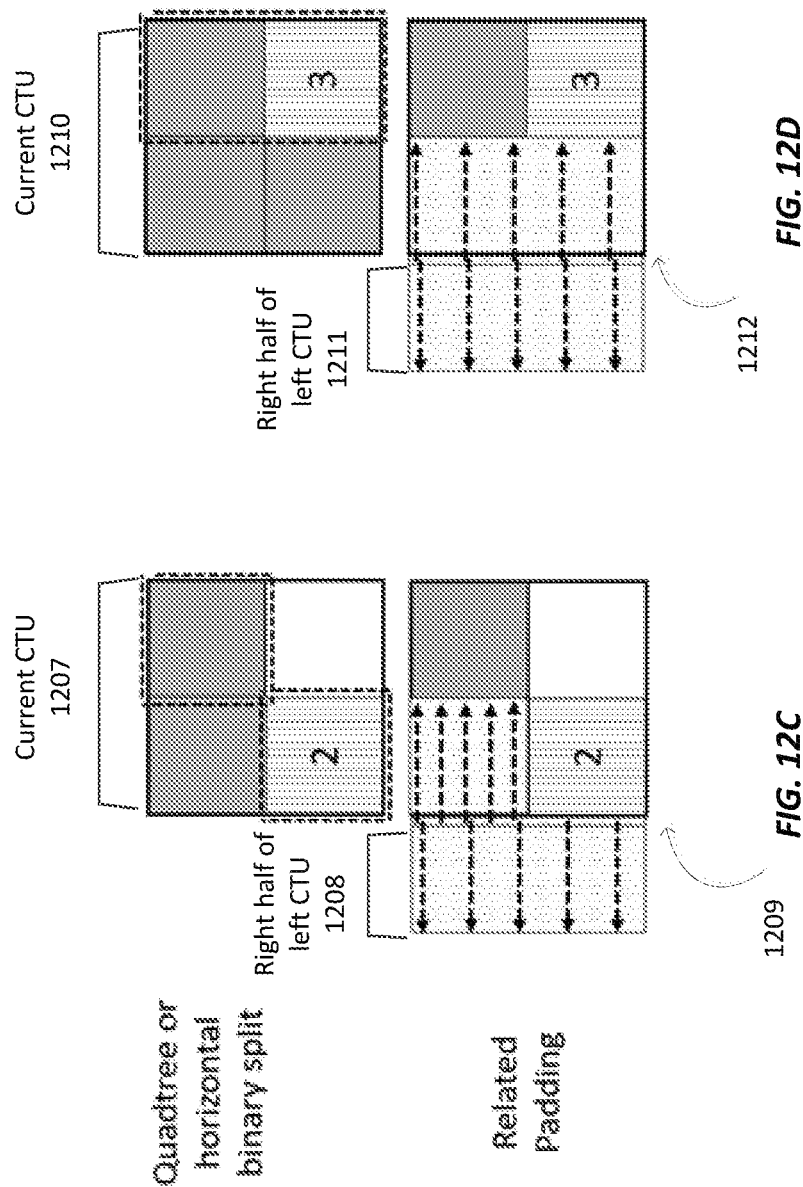

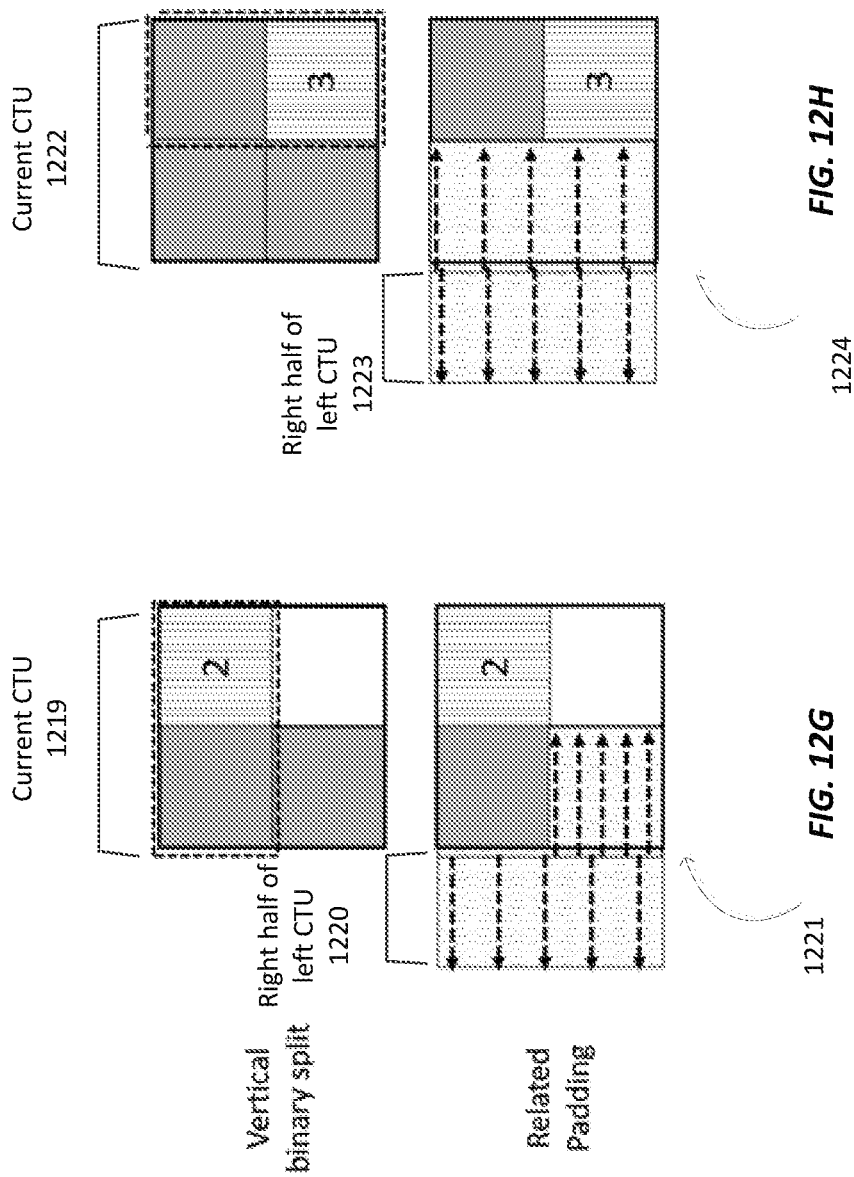

METHOD AND APPARATUS FOR VIDEO CODING

INCORPORATION BY REFERENCE

This present application is a continuation of U.S. application Ser. No. 16/734,107 filed Jan. 3, 2020, and claims the benefit of priority to U.S. Provisional Application No. 62/788,935, "Intra picture block compensation with boundary padding" filed on Jan. 6, 2019, which are incorporated by reference herein in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920× 1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of a neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding," December 2016). Out of the many MV prediction mechanisms that H.265 offers, described herein is a technique henceforth referred to as "spatial merge."

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video coding at a decoder. In an embodiment, a method of video coding at a decoder is provided. In the method, prediction information of a current block in a current coding tree unit (CTU) from a coded video bitstream is decoded. The prediction information indicates an intra block copy (IBC) mode. Padded values of a reference block are determined based on a block vector that points to the reference block. The padded values of the reference block are copied from a reference sample line. At least a sample of the current block is reconstructed based on the padded values of the reference block.

In an embodiment, reconstructed samples of the reference block are not stored in a reference sample memory, and the padded values of the reference block are stored in a memory that is different from the reference sample memory.

In an embodiment, the current CTU is partitioned into a top-left coding region, a top-right coding region, a bottom-left coding region, and a bottom-right coding region, and the current block is in any one of the top-left coding region, the top-right coding region, the bottom-left coding region, and the bottom-right coding region of the current CTU.

In an embodiment, the reference block is padded vertically by the reference sample line above the current CTU or horizontally by the reference sample line to the left of the current CTU.

In an embodiment, when a maximum size of the reference sample memory is limited to four sets of 64×64 luma samples and corresponding chroma samples, the reference sample memory stores reconstructed samples of a current 64×64 coding region and reconstructed samples of three 64×64 reference coding regions, each of the three 64×64 reference coding regions being either in one of the current CTU and an adjacent left CTU, and the three 64×64 reference coding regions do not include all the reconstructed samples of the reference block.

In an embodiment, an adjacent left CTU is partitioned into a top-left reference coding region, a top-right reference coding region, a bottom-left reference coding region, and a bottom-right reference coding region, and each of the reference coding regions in the left CTU including reconstructed samples that are not stored in the reference sample memory is padded by the reference sample line above the current CTU or to the left of the current CTU.

In an embodiment, an adjacent left CTU is partitioned into a top-left reference coding region, a top-right reference coding region, a bottom-left reference coding region, and a bottom-right reference coding region, and the reference block is included in the top-right reference coding region or the bottom-right reference coding region of the left CTU, or in the current CTU.

In an embodiment, when a maximum size of the reference sample memory is limited to three sets of 64×64 luma samples and corresponding chroma samples, the reference sample memory stores reconstructed samples of a current 64×64 coding region and reconstructed samples of two 64×64 reference coding regions, each of the two 64×64 reference coding regions being either in one of the current CTU and the left CTU, and the two 64×64 reference coding regions do not include all the reconstructed samples of the reference block.

In an embodiment, each of the top-right reference coding region of the left CTU, the bottom-right reference coding region of the left CTU, and reference coding regions in the current CTU including reconstructed samples that are not stored in the reference sample memory is padded by the reference sample line above the current CTU or to the left of the current CTU.

In an embodiment, when a maximum size of the reference sample memory is limited to two sets of 64×64 luma samples and corresponding chroma samples, the reference sample memory stores reconstructed samples of a current 64×64 coding region and reconstructed samples of one 64×64 reference coding region in one of the current CTU or the left CTU, and the 64×64 reference coding region includes all the reconstructed samples of the reference block.

In an embodiment, each of the top-right reference coding region of the left CTU, the bottom-right reference coding region of the left CTU, and reference coding regions in the current CTU including reconstructed samples that are not stored in the reference sample memory is padded by the reference sample line above the current CTU or to the left of the current CTU.

In an embodiment, each of a plurality of reference coding regions of the current CTU and an adjacent left CTU are padded horizontally by a first reference sample line above the current CTU or vertically by a second reference sample line to the left of the current CTU based on (i) a first distance between each of the plurality of the reference coding regions and the first reference sample line above the current CTU and (ii) a second distance between each of the plurality of the reference coding regions and the second reference sample line to the left of the current CTU.

In an embodiment, the reference block is padded by boundary pixels of a reconstructed reference block in one of the current CTU and an adjacent left CTU, and reconstructed samples of the reconstructed reference block are stored in the reference sample memory.

Aspects of the disclosure also provide an apparatus configured to perform any of the above methods. In an embodiment of the present disclosure, there is provided an apparatus. The apparatus includes processing circuitry. The processing circuitry is configured to decode prediction information of a current block in a CTU from a coded video bitstream, the prediction information indicating an IBC mode. The processing circuitry is configured to determine padded values of a reference block based on a block vector that points to the reference block, the padded values of the reference block being copied from a reference sample line. Further, the processing circuitry is configured to reconstruct at least a sample of the current block based on the padded values of the reference block.

Aspects of the disclosure also provide non-transitory computer-readable storage mediums storing instructions which when executed by a computer cause the computer to perform any of the above methods.

BRIEF DESCRIPTION OF THE DRAWINGS

Further features, the nature, and various advantages of the disclosed subject matter will be more apparent from the following detailed description and the accompanying drawings in which:

FIGS. 10A-10H show examples of boundary padding using IBC-based compensation with a memory storing four sets of reference samples in accordance with some embodiments.

FIGS. 11A-11H show examples of boundary padding using IBC-based compensation with a memory storing three sets of reference samples in accordance with some embodiments.

FIGS. 12A-12H show examples of boundary padding using IBC-based compensation with a memory storing two sets of reference samples in accordance with some embodiments.

DETAILED DESCRIPTION OF EMBODIMENTS

I. Video Coding Encoder and Decoder

Figure 1:
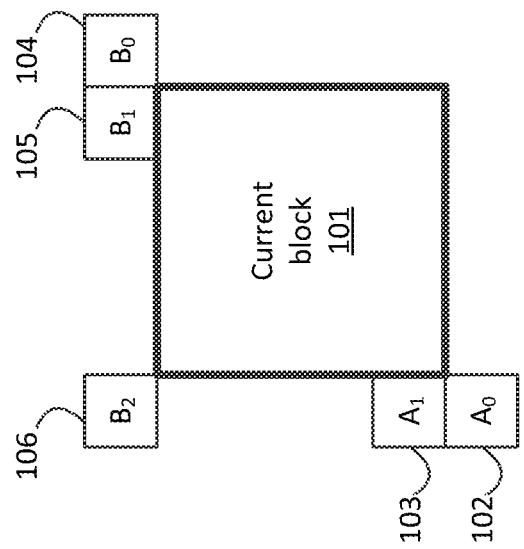
FIG. 1 is a schematic illustration of a current block and its surrounding spatial merge candidates in one example.
Figure 2:
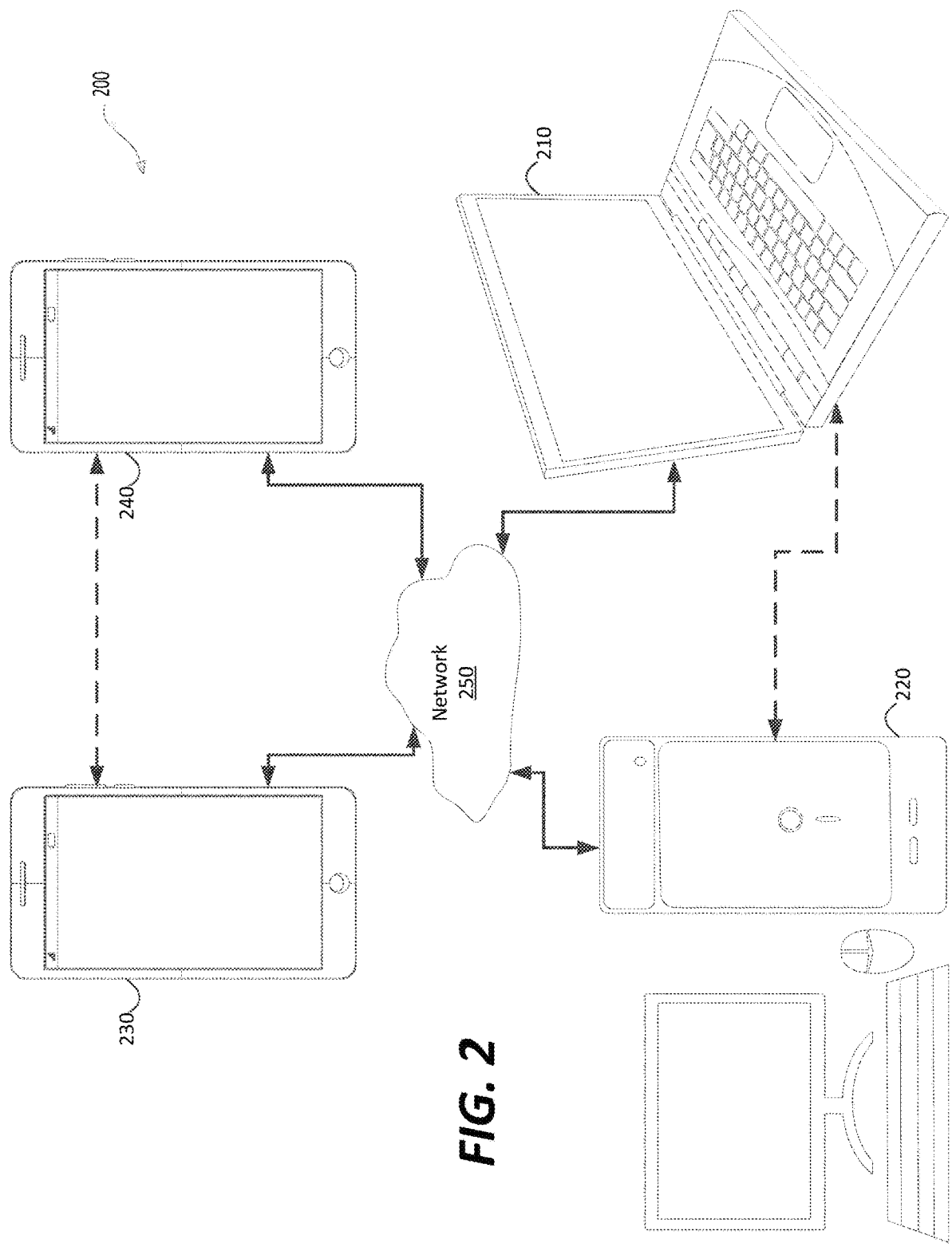
FIG. 2 is a schematic illustration of a simplified block diagram of a communication system (200) in accordance with an embodiment of the present disclosure.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers, and smart phones, but the principles of the present disclosure may be not so limited. Embodiments of the present disclosure find application with laptop computers, tablet computers, media players, and/or dedicated video conferencing equipment. The network (250) represents any number of networks that convey coded video data among the terminal devices (210), (220), (230), and (240), including for example wireline (wired) and/or wireless communication networks. The communication network (250) may exchange data in circuit-switched and/or packet-switched channels. Representative networks include telecommunications networks, local area networks, wide area networks, and/or the Internet. For the purposes of the present discussion, the architecture and topology of the network (250) may be immaterial to the operation of the present disclosure unless explained herein below.

Figure 3:
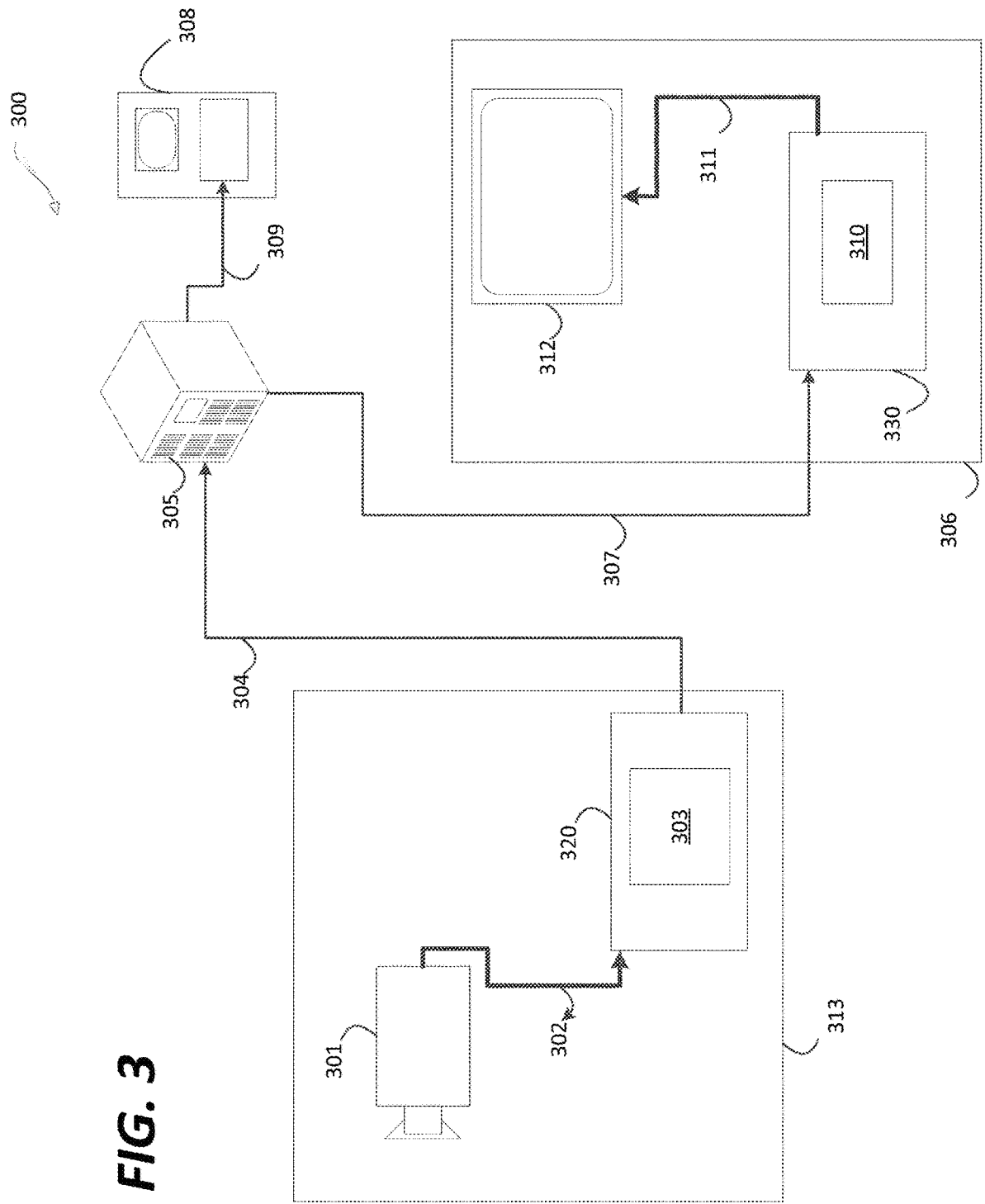
FIG. 3 is a schematic illustration of a simplified block diagram of a communication system (300) in accordance with an embodiment of the present disclosure.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
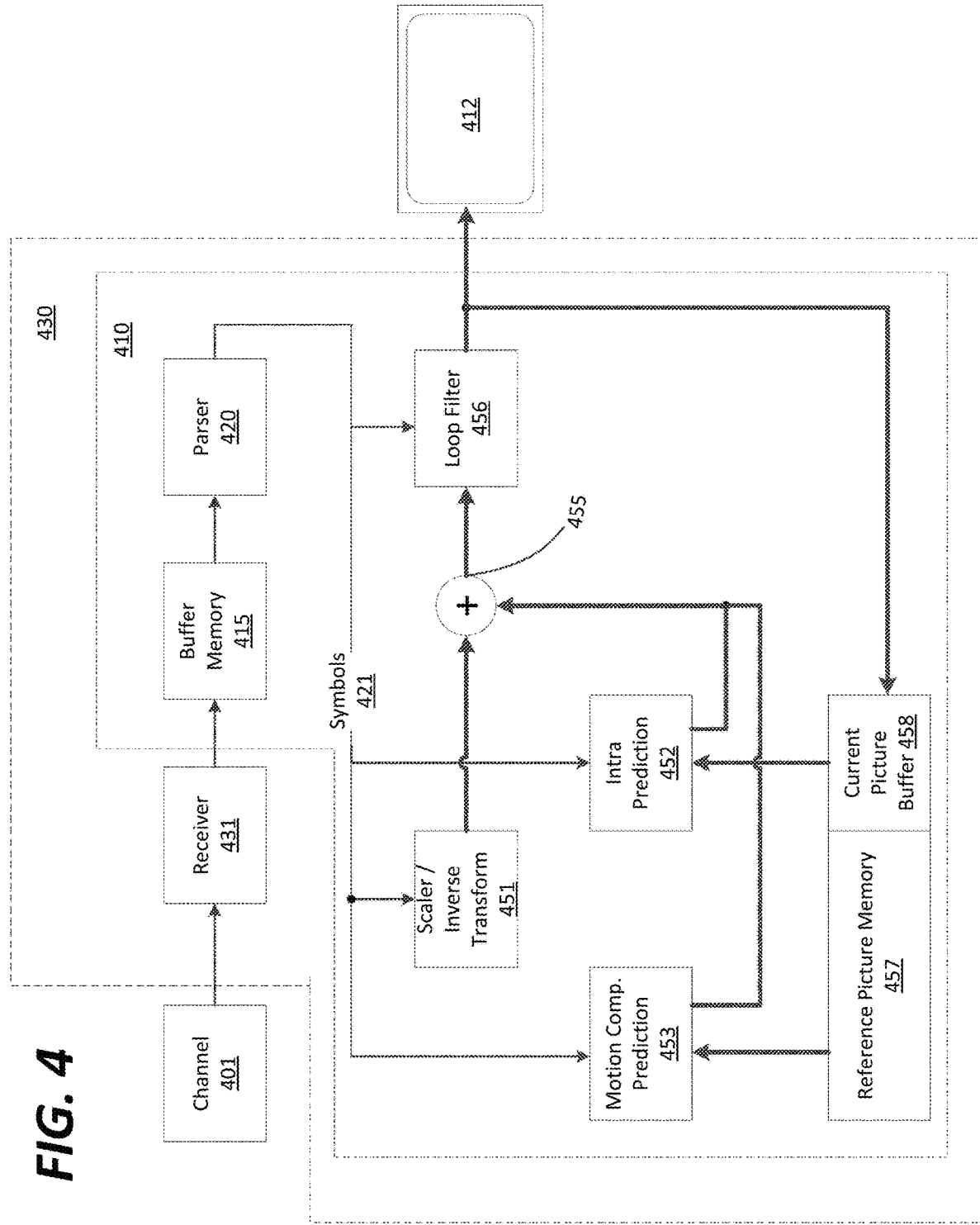
FIG. 4 is a schematic illustration of a simplified block diagram of a decoder in accordance with an embodiment of the present disclosure.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs), and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
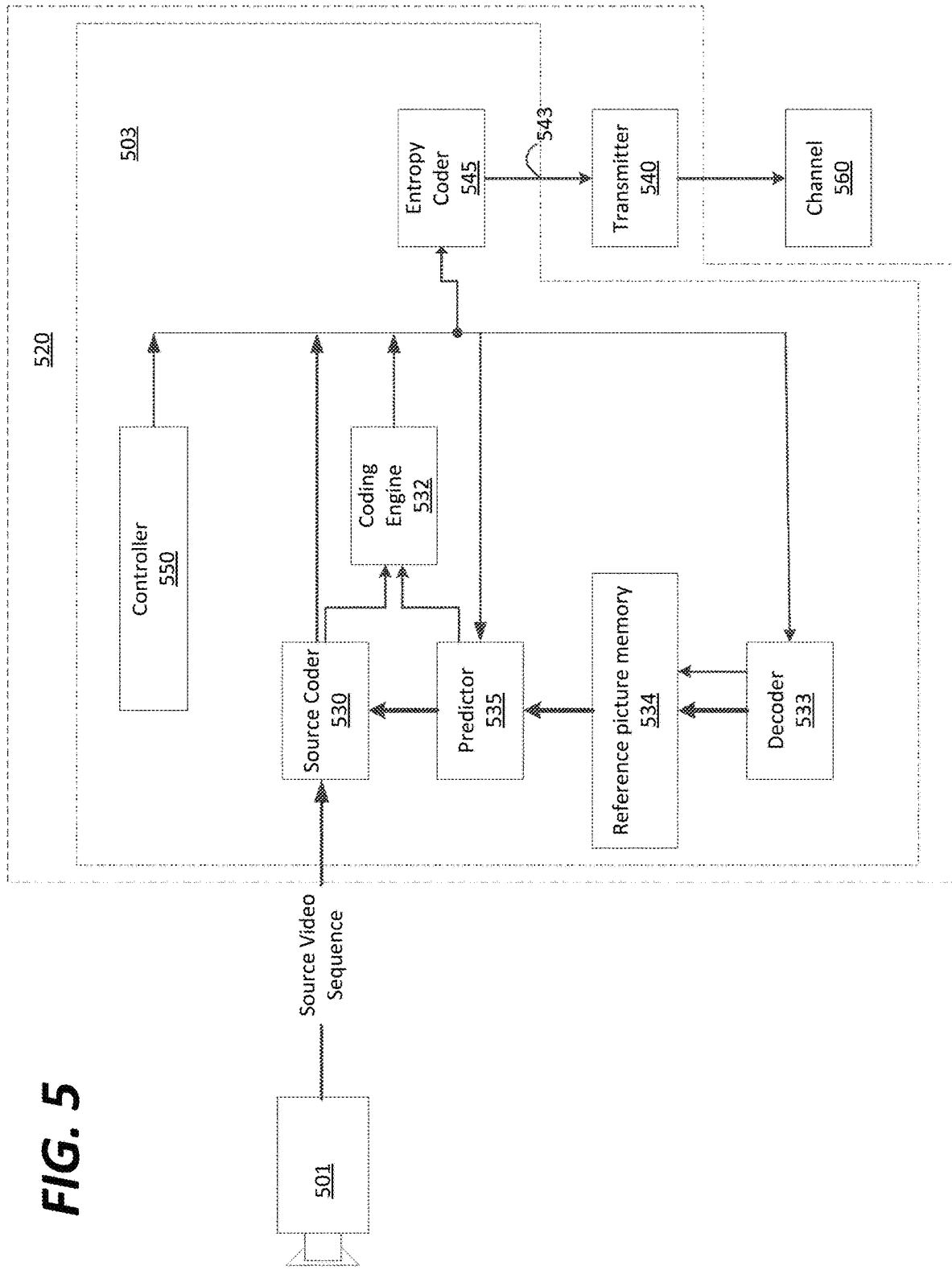
FIG. 5 is a schematic illustration of a simplified block diagram of an encoder in accordance with an embodiment of the present disclosure.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by losslessly compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
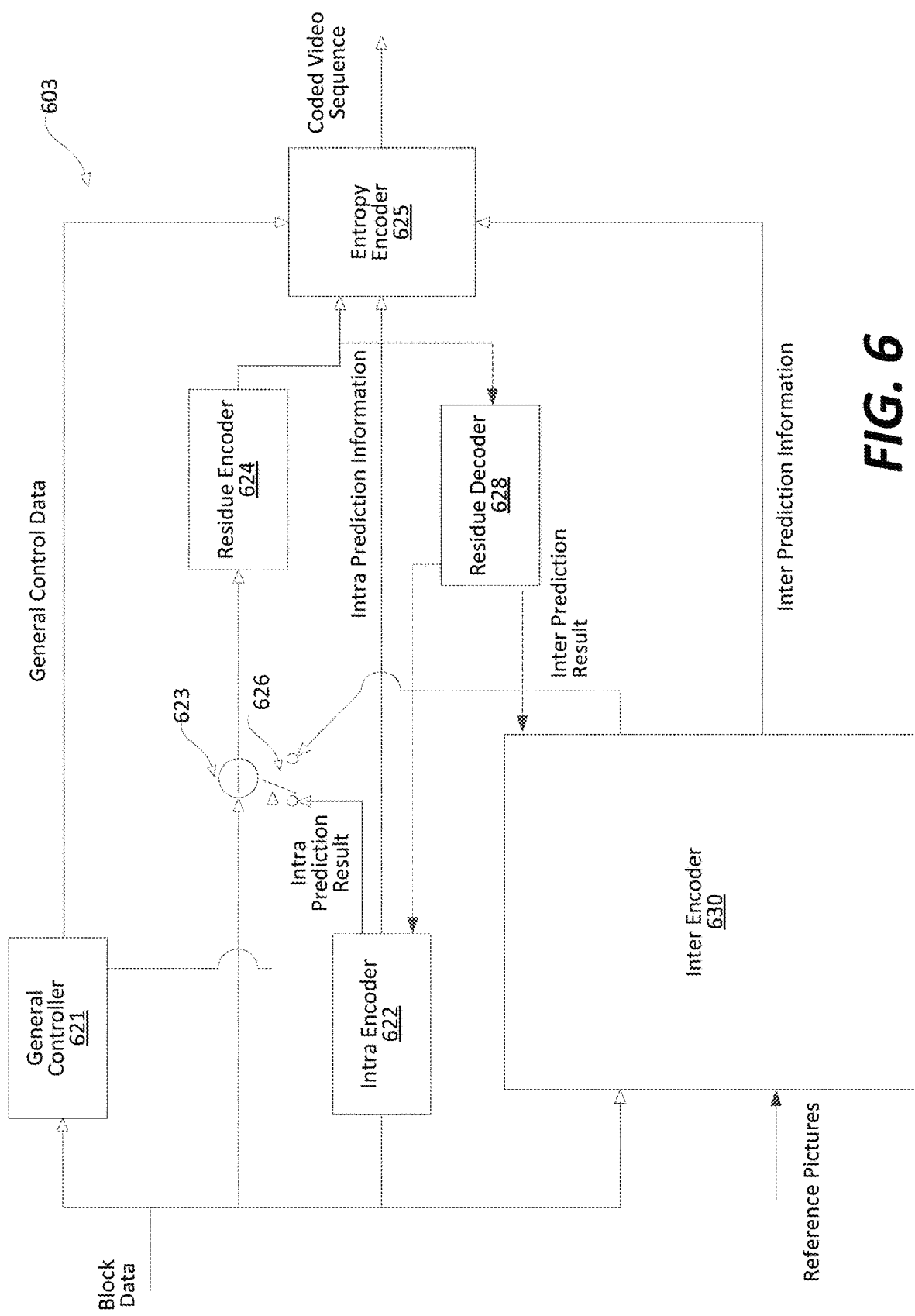
FIG. 6 shows a block diagram of an encoder in accordance with an embodiment of the present disclosure.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
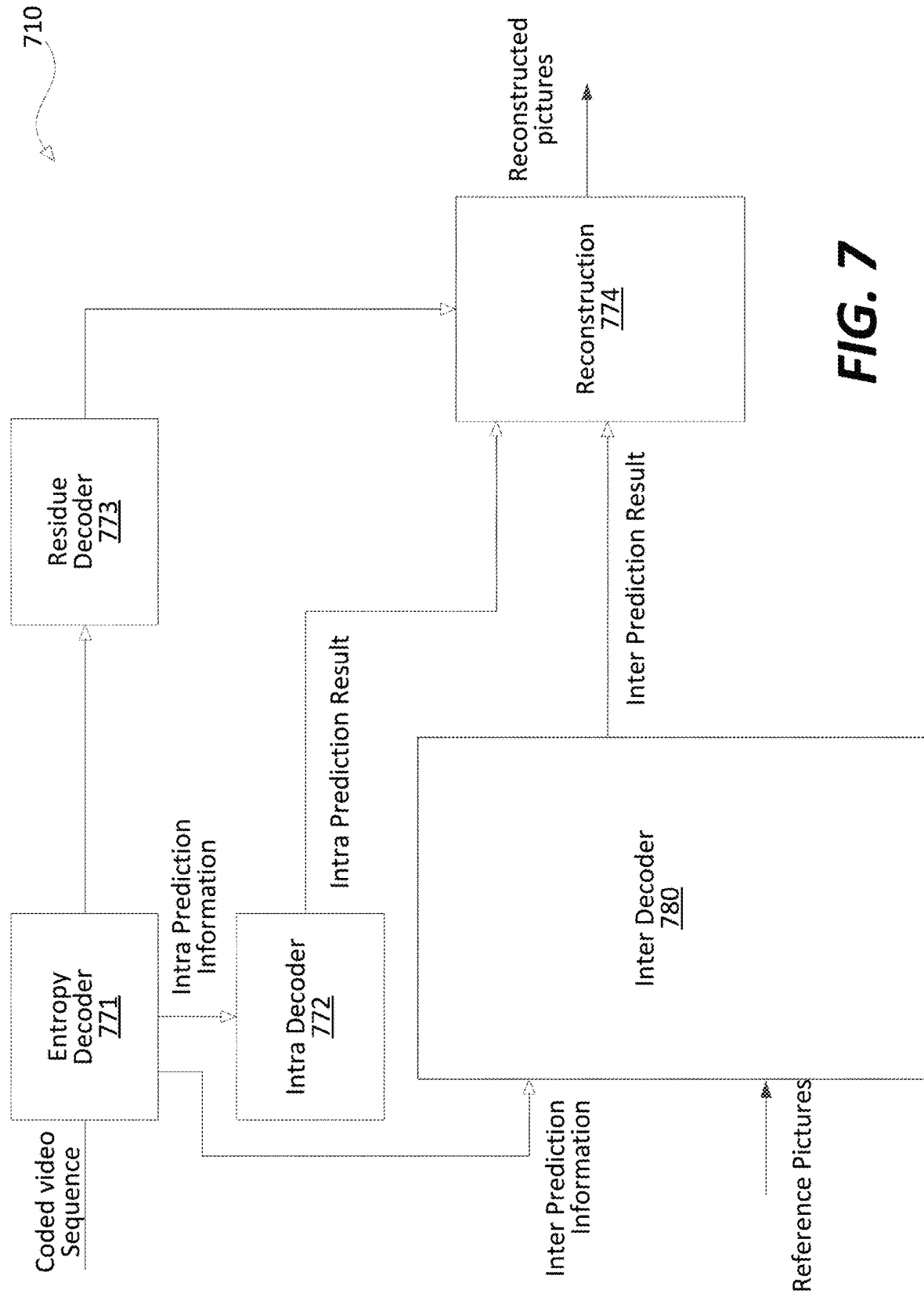
FIG. 7 shows a block diagram of a decoder in accordance with an embodiment of the present disclosure.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

II. Intra Block Copy

A block can be coded using a reference block from a different or same picture. Block based compensation using a reference block from a different picture can be referred to as motion compensation. Block based compensation using a reference block from a previously reconstructed area within the same picture can be referred to as intra picture block compensation, current picture referencing (CPR), or intra block copy (IBC). A displacement vector that indicates the offset between the current block and the reference block can be referred to as a block vector (BV). Different from a motion vector in motion compensation, which can be any value (positive or negative, at either the x or y direction), a BV is subject to constraints to ensure that the reference block has already been reconstructed and the reconstructed samples thereof are available. In some embodiments, in view of parallel processing constraints, a reference area that is beyond certain boundaries (e.g., a tile boundary or wavefront ladder shape boundary) is excluded.

The coding of a BV can be either explicit or implicit. In the explicit mode, the difference between a BV and its predictor can be signaled in a manner similar to an Advanced Motion Vector Prediction (AMVP) mode in inter coding. In the implicit mode, the BV can be recovered from only a predictor, for example in a similar way as a motion vector in merge mode. The resolution of a BV, in some implementations, is set to integer positions or, in some examples, fractional positions.

The use of IBC at the block level can be signaled using a block level flag (or IBC flag). In some examples, this flag can be signaled when the current block is not coded in merge mode. In other examples, this flag can be signaled by a reference index approach, for example, by treating the current decoded picture as a reference picture. Such a reference picture can be placed in the last position of the list, such as in HEVC Screen Content Coding (HEVC SCC). This special reference picture can also be managed together with other temporal reference pictures in the Decoded Picture Buffer (DPB).

While an embodiment of IBC is used as an example in the present disclosure, the embodiments of the present disclosure can be applied to variations of IBC. The variations for IBC include, for example, flipped IBC where the reference block is flipped horizontally or vertically before being used to predict a current block, or line based IBC where each compensation unit inside an M×N coding block is an M×1 or 1×N line.

Figure 8:
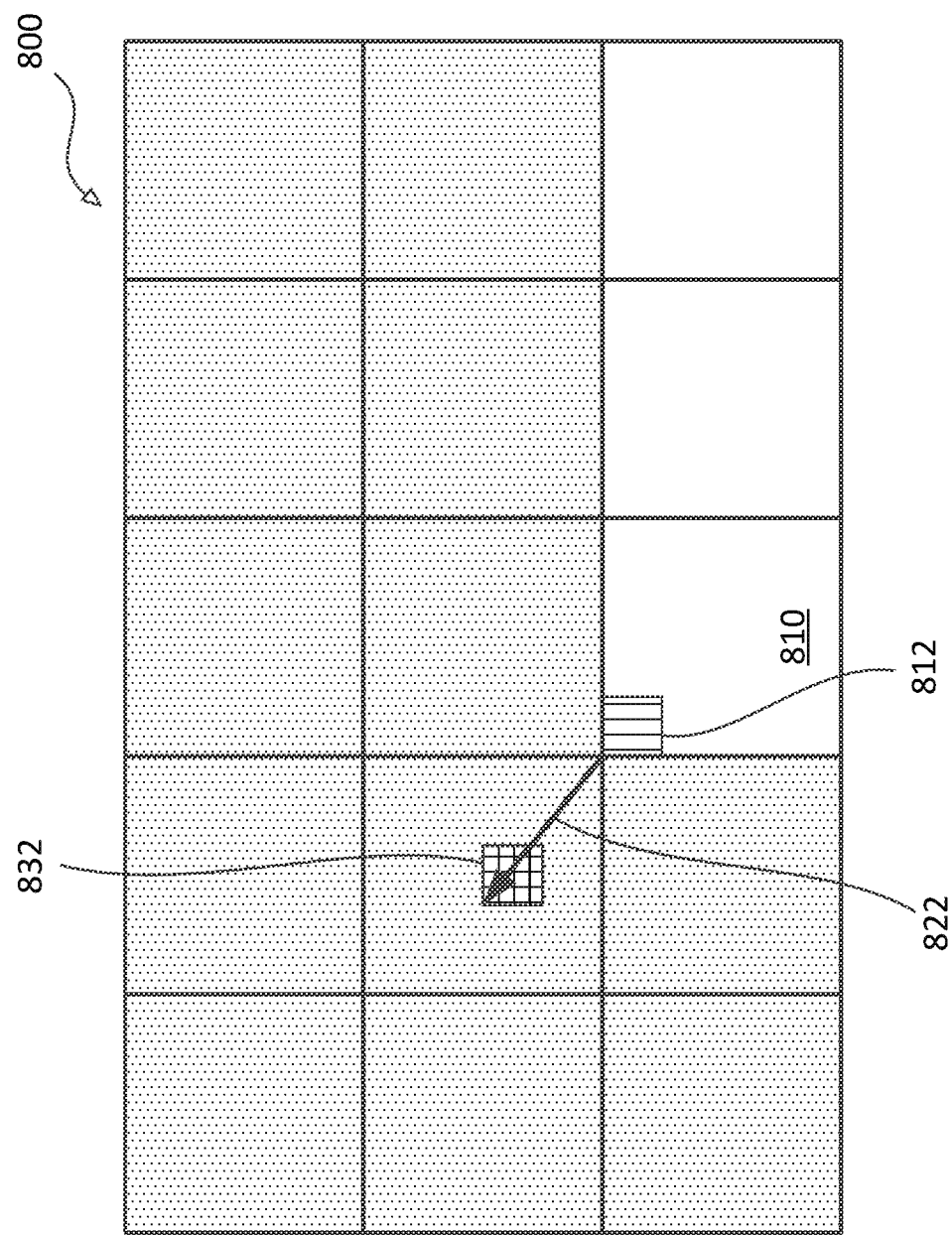
FIG. 8 is a schematic illustration of a current block in a current picture coded using intra block copy (IBC) in accordance with an embodiment of the present disclosure.

FIG. 8 is a schematic illustration of a current block (810) in a current picture (800) to be coded using IBC-based compensation in accordance with an embodiment. In FIG. 8, an example of using IBC-based compensation is shown where the current picture (800) includes 15 blocks arranged into 3 rows and 5 columns. In some examples, each block corresponds to a coding tree unit (CTU). The current block (810) includes a sub-block (812) (e.g., a coding block in the CTU) that has a block vector (822) pointing to a reference sub-block (832) in the current picture (800).

The reconstructed samples of the current picture can be stored in a memory or memory block (e.g., a dedicated or designated memory or portion of memory). In consideration of implementation cost, the reference area where the reconstructed samples for reference blocks remain available may not be as large as an entire frame, depending on a memory size of the dedicated memory. Therefore, for a current sub-block using IBC-based compensation, in some examples, an IBC reference sub-block may be limited to only certain neighboring areas, but not the entire picture.

In one example, the memory size is limited to a size of one CTU, which means the IBC mode can only be used when the reference block is within the same CTU as the current block. In another example, the memory size is limited to a size of two CTUs, which means the IBC mode can only be used when the reference block is either within the current CTU, or the CTU to the left of current CTU. When the reference block is outside the constrained reference area (i.e., designated local area), even if it has been reconstructed, the reference samples cannot be used for IBC-based compensation.

With the constrained reference area, the efficiency of IBC-based compensation is limited. There is a need to further improve the efficiency of IBC-based compensation with the constrained reference area.

III. Block Partitioning in VVC

A picture may be divided into an array of non-overlapped CTUs, such as in VVC. The size of a CTU may be set to be 128×128 luma samples and the corresponding chroma samples. The number of the corresponding chroma samples may depend on the color format. A CTU can be split into CUs using one or a combination of tree splitting methods.

For example, a CTU can be split into CUs using a Quaternary-Tree (QT) split. This splitting method is the same as in HEVC for example. Each parent block is split in half in both horizontal and vertical directions. The resulting four smaller partitions are in the same aspect ratio as its parent block. For example, in VVC, a CTU is first split by QT recursively. Each QT leaf node (in square shape) can be further split recursively using the multi-type (Binary-Tree and Ternary-Tree) tree as described below. The Binary-Tree (BT) split refers to dividing the parent block in half in either a horizontal or vertical direction. The resulting two smaller partitions are half in size as compared to the parent block. The Ternary-Tree (TT) split refers to dividing the parent block in three parts in either a horizontal or vertical direction. The middle of the three parts is twice as large as the other two parts. The resulting three smaller partitions are ¼, ½ and ¼ in size respectively as compared to the parent block.

The partition of a parent block may be constrained such that at a 128×128 level, the following partitioning results for partitioning the parent block are allowed: 128×128, two 128×64, two 64×128, and four 64×64. The partition of the parent block may be further constrained such that at a 128×64 or 64×128 level, the TT splits at either a horizontal or vertical direction are not allowed. In addition, if there is any further split, the child blocks may be constrained to two 64×64 blocks.

The search range for IBC can be constrained within the current CTU where a current coding block is located. A CTU size memory can be reused to effectively extend the compensation range of IBC.

IV. Fixed Size Reference Search Range of Intra Block Copy with Boundary Padding Aspects of the present application provide methods to improve the IBC-based compensation performance under certain reference area constraints. Specifically, the size of a reference sample memory can be constrained. For example, a maximum size of the reference sample memory can be limited to N 64×64 luma samples and the corresponding chroma samples, where N may be 4, 3, or 2. The number of the corresponding chroma samples may depend on the color format. The methods described herein can be extended to other values of N. Some methods have been proposed regarding how to allocate the reference sample memory to store some of previously decoded regions according to the location of a current coding block in a current CTU. In those methods, the search range for the IBC-based compensation depends on the location of the current coding block in the current CTU. The previously decoded regions that are not stored in the reference sample memory cannot be used for reconstruction of a sample of current block.

Figure 9:
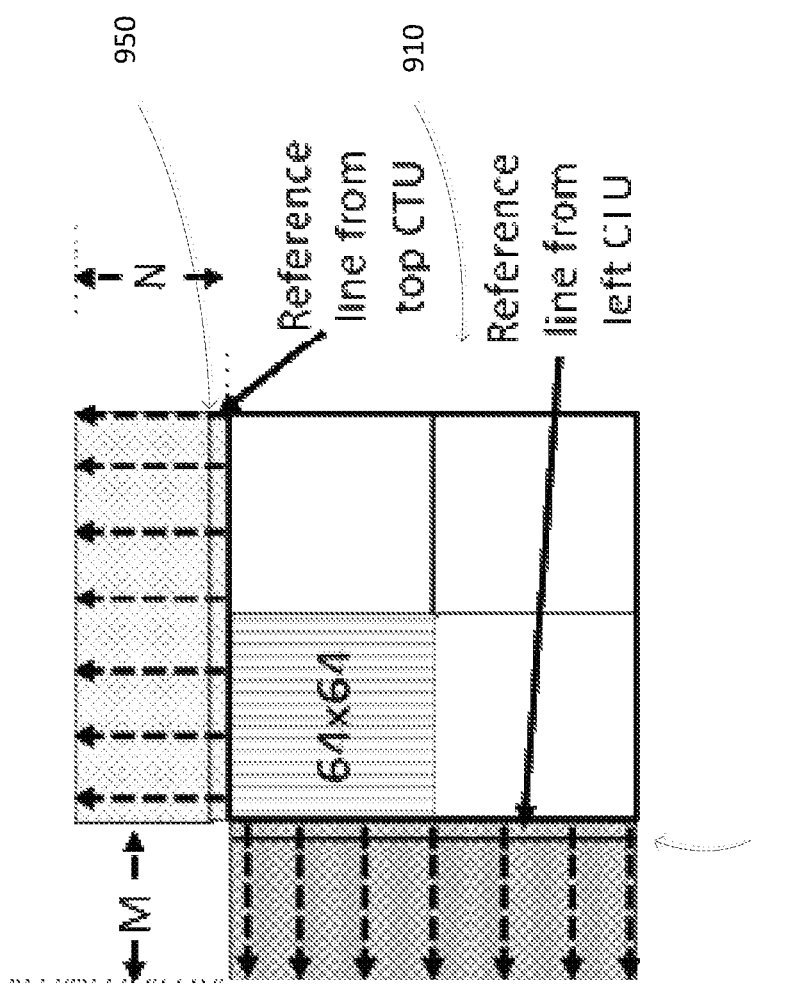
FIG. 9 shows an example of padding a nearest reference sample line above a current coding tree unit (CTU) and padding another nearest reference sample line to the left of the current CTU in accordance with an embodiment of the present disclosure.

FIG. 9 shows an example of padding a nearest reference sample line above a current CTU to N rows above the current CTU and padding another nearest reference sample line to the left of the current CTU to M columns to the left of the current CTU according to an embodiment of the present disclosure. N and M may be positive integers. In FIG. 9, the nearest reference sample line (950) on top of the current CTU (910) and the nearest reference sample line (970) to the left of the current CTU (910) may be stored in a memory for intra prediction of coding blocks near the boundary of the current CTU (910). The memory may be different from the reference sample memory described above.

An example of padding (e.g., extending or copying) the reference sample line (950) on top of the current CTU to N rows and the reference sample line (970) to the left CTU reference line to M columns is shown in FIG. 9. Specifically, the current CTU (910) is partitioned into four 64×64 blocks. The pixel values (i.e., reference sample values) of the nearest reference sample line (950) on top of the current CTU (910) are extended to N rows above the current CTU (910). Similarly, the pixel values of the nearest reference sample line (970) to the left of the current CTU (910) are extended to M columns to the left of the current CTU (910).

Aspects of the present application provide methods that utilize boundary padding in IBC-based compensation so that when block vectors point to reconstructed but unavailable reference areas, pixels values from an available reference area (e.g., the top reference sample line/left reference sample line) may be extended vertically/horizontally to cover those unavailable reference areas. Therefore, reconstructed samples in the unavailable reference area can be represented by the padded values for the IBC-based compensation. Accordingly, the search range of the IBC-based compensation can be increased as more BVs become valid.

A memory that stores reference samples of previously decoded CUs for future IBC-based compensation may be referred to as a reference sample memory. The reference sample memory can be a dedicated or designated memory, as described above.

According to some embodiments of the present disclosure, methods are proposed to improve IBC-based compensation performance under certain reference area constraints. More specifically, the size of a reference sample memory may be constrained. In the following discussion, the size of the reference sample memory may be fixed to be two set of (e.g., 64×64 sized) luma samples (together with corresponding chroma samples), three sets of (e.g., 64×64 sized) luma samples (together with corresponding chroma samples), four sets of (e.g., 64×64 sized) luma samples (together with corresponding chroma samples), or another suitable memory size. In one example, the size of the reference sample memory is a size of one CTU, such as one previously decoded CTU or one left CTU. In another example, the size of the reference sample memory is a size of two CTUs, such as two previously decoded CTUs or two left CTUs, or one current CTU together with one left CTU. In some embodiments, each CTU requires a memory size for storing 128× 128 luma samples, together with corresponding chroma samples. When a reference block is outside the stored reconstructed areas, the reference block cannot be used for the IBC-based compensation.

Embodiments of the present disclosure include methods for utilizing the one or more 64×64 sized reference sample memory blocks to optimize the search range of the IBC-based compensation.

The size of an IBC coded block can be as large as any regular inter coded block in general. In some embodiments of the present disclosure, in order to utilize the reference sample memory more efficiently, the size of an IBC coded block can be limited to, for example, 64 luma samples at either width or height edge and chroma samples with corresponding size constraints, depending on the color format. The color can be, for example, in 4:2:0 format and the size of a chroma block in IBC mode may not be larger than 32 samples on each side. Lower limits, such as 32 luma samples on each side can be used as the size of the IBC coded block. In the following discussion of the present disclosure, it is assumed that the maximum IBC coded block size is 64×64 luma samples. The block size of the corresponding chroma samples may depend on the color format, as described above. However, the methods described in the present disclosure can be performed in general without the limits described above.

Aspects of the present application include methods that utilize a fixed size search range for IBC-based compensation. Specifically, boundary padding in the IBC-based compensation may be used to extend pixel values from available reconstructed areas to the reconstructed but unavailable reference areas. In some embodiments of the present disclosure, pixels values from a top reference sample line/left reference sample line may be extended vertically/horizontally to cover those areas. Therefore, the reconstructed samples in an unavailable reference area can be represented by the padded values for the IBC-based compensation. Accordingly, the search range of the IBC mode can be increased as more BVs become valid.

In an embodiment of the present disclosure, all reconstructed reference samples in a current CTU and an entire left CTU of the current CTU can be used as the search range. For example, the current and left CTUs can be used as the search range for a current coding block in the current CTU for the IBC-based compensation, regardless of the location of the current coding block in the current CTU. The left CTU may be adjacent to the current CTU. For example, in FIGS. 10A-10H, the areas that have been reconstructed but not available for reference due to the limited local reference sample memory size are padded by one or more reference sample lines from a top CTU above the left CTU. The padding can be performed with one or more reference sample lines from other CTUs (e.g., a CTU to the left of the left CTU) in other embodiments.

FIGS. 10A-10D illustrate examples of reference sample memory usage for the IBC-based compensation and boundary padding for unavailable reference areas when four sets of (e.g., 64×64 sized) sized reference sample memory blocks are used and when a quadtree or horizontal binary tree split (e.g., at a 128×128 level) is used. FIGS. 10E-10H illustrate examples of reference sample memory usage for the IBC-based compensation and boundary padding for unavailable reference areas when four sets of (e.g., 64×64 sized) reference sample memory blocks are used and when a vertical binary tree split (e.g., at a 128×128 level) is used.

In FIGS. 10A-10H, one of the four sets of (e.g., 64×64 sized) reference sample memory blocks may be used to store reconstructed samples of the current 64×64 coding region, and the other three sets of (e.g., 64×64 sized) reference sample memory blocks may be used to store reconstructed samples of previously decoded 64×64 coding regions. Each of the areas with vertical stripes is a 64×64 region where the current coding block is located, which is marked with 0, 1, 2, or 3 respectively depending on the location of the current coding block. Each of the shaded areas is a previously decoded and reconstructed area. Each of the reconstructed but unavailable reference areas is a shaded area with an X mark. Padding of the CTU boundary reference samples are applied to the reconstructed but unavailable reference areas (areas with dotted arrows).

The search range may not always be the same for the current coding block located in each of the four 64×64 coding regions in the current CTU as certain reference areas may be unavailable. Specifically, the search range for the current coding block in the current CTU may depend on the location of the current coding block in the current CTU. However, after performing vertical padding on the unavailable reference areas, the search range for the current coding block in the current CTU can be extended to the entire left CTU and the reconstructed areas of the current CTU regardless of the location of the current coding block in the current CTU.

Figures 10A, 10B:
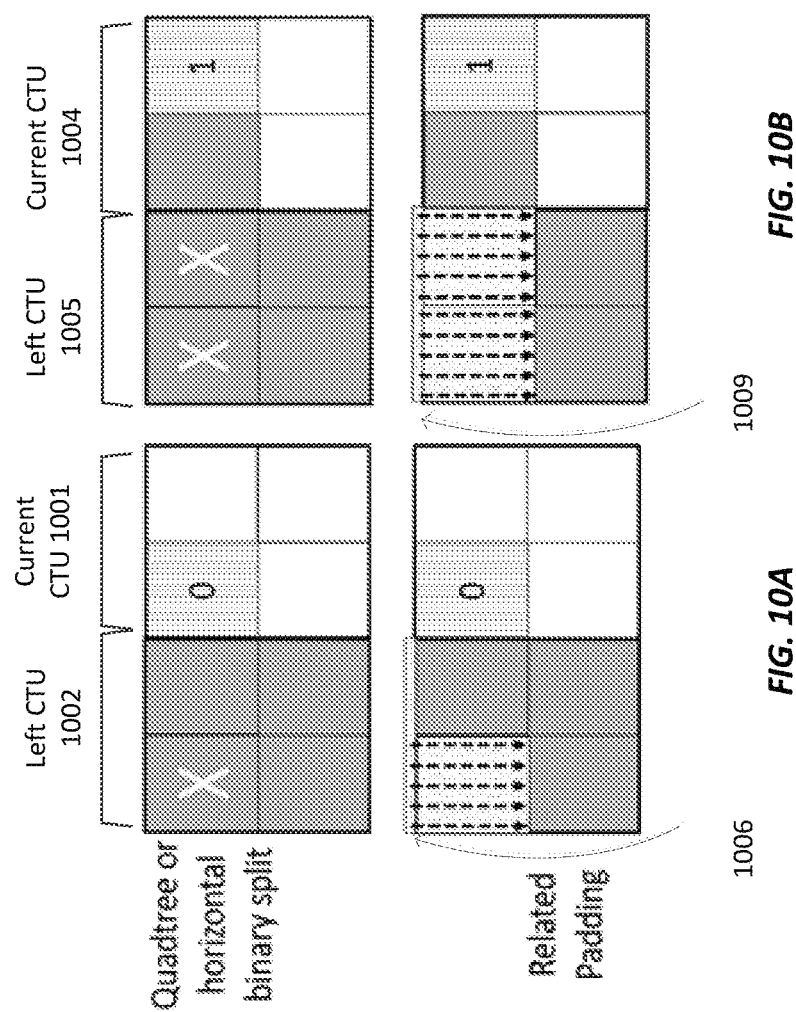
Figures 10C, 10D:
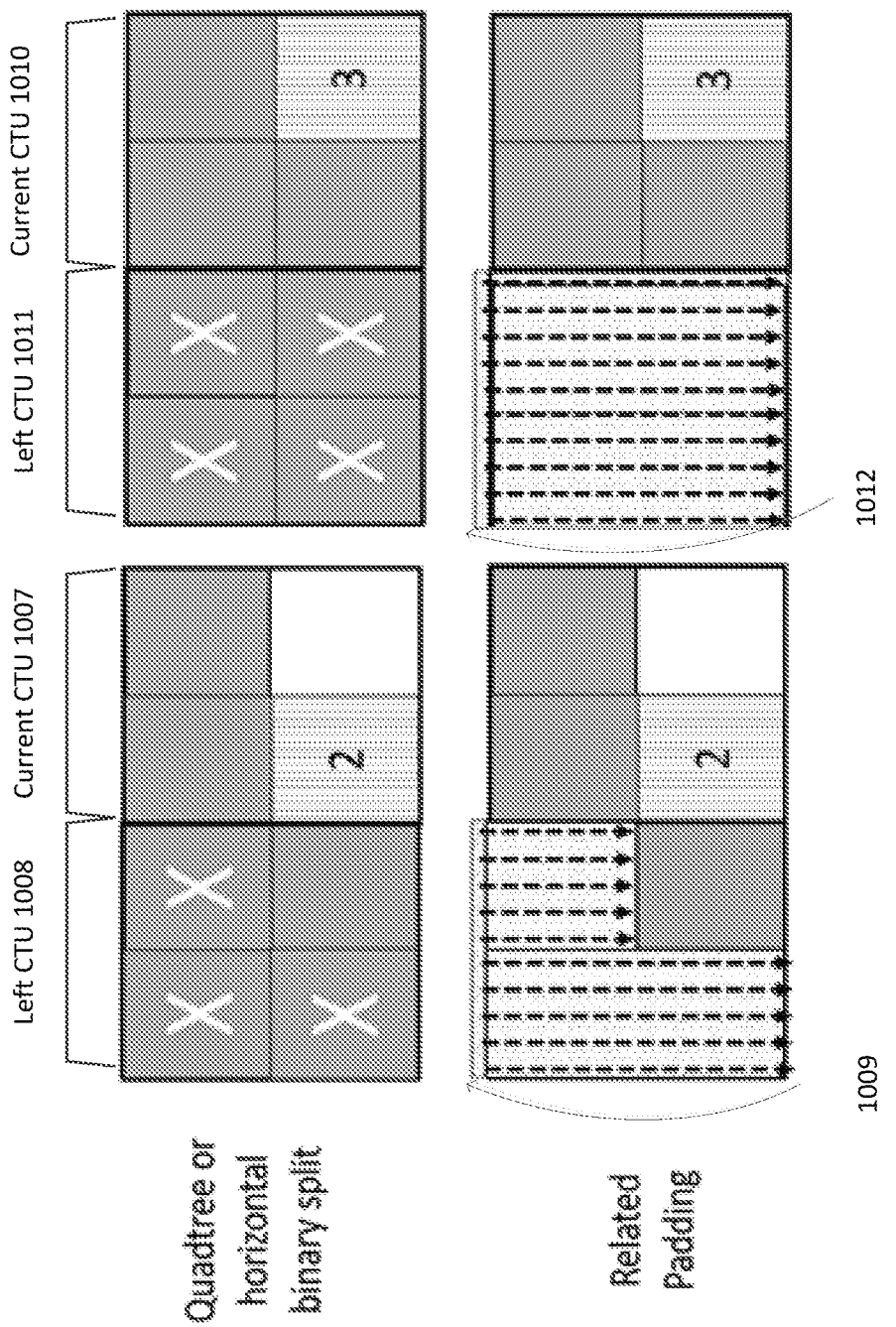
Figures 10E, 10F:
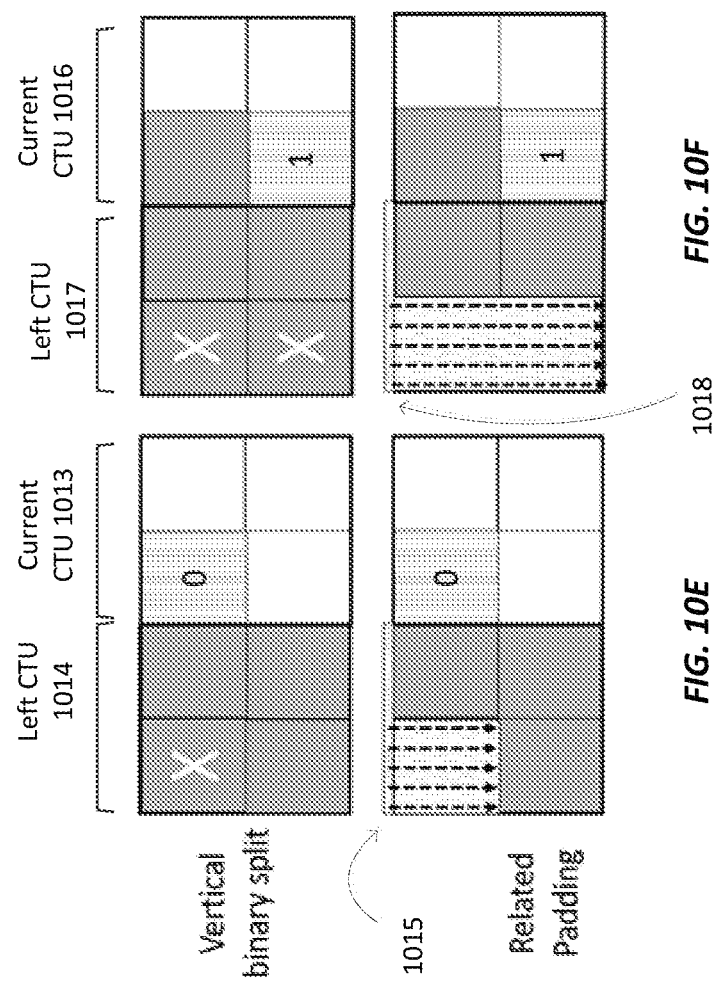

For example, as shown in FIG. 10A and FIG. 10E, when the current coding block is at a top-left block of the current CTU (1001, 1013), the search range may include a top-right block, a bottom-left block, and a bottom-right block of the left CTU (1002, 1014). The search range may further include reconstructed areas in the current CTU (1001, 1013) in some embodiments. The search range may not include a top-left block of the left CTU (1002, 1014) due to the size of the reference sample memory. In some examples, vertical padding may be used to copy the pixels values of a reference sample line (1003, 1015) from a top CTU to the top-left block of the left CTU (1002, 1014). The padded pixel values may be stored in a memory different from the reference sample memory. The memory may be used for intra prediction of the coding blocks near the boundary of the current CTU. Therefore, after the padding, the search range for the current coding block in the current CTU (1001, 1013) may be the entire left CTU (1002, 1014) and the reconstructed areas of the current CTU (1001, 1013).

In FIG. 10B, when a quadtree or horizontal binary tree split at (e.g., a 128×128 level) is used and when the current coding block is at a top-right block of the current CTU (1004), the search range may include a top-left block of the current CTU (1004), and a bottom-left block and a bottom-right block of the left CTU (1005). The search range may further include reconstructed areas in the current CTU (1004) in some embodiments. A top-left block and a top-right block of the left CTU (1005) may not be available due to the size of the reference sample memory. In some examples, vertical padding may be used to copy the pixels values of a reference sample line (1006) from a top CTU to the top-left block and the top-right block of the left CTU (1005). The padded pixel values may be stored in a memory different from the reference sample memory. The memory may be used for intra prediction of the coding blocks near the boundary of the current CTU. Therefore, after the padding, the search range for the current coding block in the current CTU (1004) may include the entire left CTU (1005) and the reconstructed areas of the current CTU (1004).

In FIG. 10C, when a quadtree or horizontal binary tree split (e.g., at a 128×128 level) is used and when the current coding block is at a bottom-left block of the current CTU (1007), the search range may include a top-left block and a top-right block of the current CTU (1007), and a bottom-right block of the left CTU (1008). The search range may further include reconstructed areas in the current CTU (1007) in some embodiments. A top-left block, a top-right block, and a bottom-left block of the left CTU (1008) may not be available due to the size of the reference sample memory. In some examples, vertical padding may be used to copy the pixels values of a reference sample line (1009) from a top CTU to the top-left block, the top-right block, and the bottom-left block of the left CTU (1008). The padded pixel values may be stored in a memory different from the reference sample memory. The memory may be used for intra prediction of the coding blocks near the boundary of the current CTU (1007). Therefore, after the padding, the search range for the current coding block in the current CTU (1007) may include the entire left CTU (1008) and the reconstructed areas of the current CTU (1007).

In FIG. 10F, when a vertical binary tree split (e.g. at a 128×128 level) is used and when the current coding block is at a bottom-left block of the current CTU (1016), the search range may include a top-left block of the current CTU (1016), and a top-right block, and a bottom-right block of the left CTU (1017). The search range may further include reconstructed areas in the current CTU (1016) in some embodiments. A top-left block and a bottom-left block of the left CTU (1017) may not be available due to the size of the reference sample memory. In some examples, vertical padding may be used to copy the pixels values of a reference sample line (1018) from a top CTU to the top-left block and the bottom-left block of the left CTU (1017). The padded pixel values may be stored in a memory different from the reference sample memory. The memory may be used for intra prediction of the coding blocks near the boundary of the current CTU (1016). Therefore, after the padding, the search range for the current coding block in the current CTU (1016) may include the entire left CTU (1017) and the reconstructed areas of the current CTU (1016).

In FIG. 10G, when a vertical binary tree split (e.g., at a 128×128 level) is used and when the current coding block is at a top-right block of the current CTU (1019), the search range may include a top-left block, a bottom-left block of the current CTU (1019), and a bottom-right block of the left CTU (1020). The search range may further include reconstructed areas in the current CTU (1019) in some embodiments. A top-left block, a top-right block, and a bottom-left block of the left CTU (1020) may not be available due to the size of the reference sample memory. In some examples, vertical padding may be used to copy the pixels values of a reference sample line (1021) from a top CTU to the top-left block, the top-right block, and the bottom-left block of the left CTU (1020). The padded pixel values may be stored in a memory different from the reference sample memory. The memory may be used for intra prediction of the coding blocks near the boundary of the current CTU (1019). Therefore, after the padding, the search range for the current coding block in the current CTU (1019) may include the entire left CTU (1020) and the reconstructed areas of the current CTU (1019).

In FIGS. 10D and 10H, when the current coding block is at a bottom-right block of the current CTU (1010, 1022), the search range may include a top-left block, a bottom-left block, and a top-right block of the current CTU (1010, 1022). The search range may further include reconstructed areas in the current CTU (1010, 1022) in some embodiments. The entire left CTU (1011 and 1023) may not be available due to the size of the reference sample memory. In some examples, vertical padding may be used to copy the pixels values of a reference sample line (1012, 1024) from a top CTU to the entire left CTU (1011, 1023). The padded pixel values may be stored in a memory different from the reference sample memory. The memory may be used for intra prediction of the coding blocks near the boundary of the current CTU (1010, 1022). Therefore, after the padding, the search range for the current coding block in the current CTU (1010, 1022) may include the entire left CTU (1011, 1023) and the reconstructed areas of the current CTU (1010, 1022).

In an embodiment of the present disclosure, all reconstructed reference samples in a current CTU and a right half (e.g., 64×128 area) part of a left CTU of the current CTU can be used as the search range, regardless of the location of a current coding block in the current CTU. The left CTU may be adjacent to the current CTU. Areas that have been reconstructed but not available for reference due to a limited local reference sample memory size may be padded by a reference sample line from a neighboring CTU, such as a top CTU of the current CTU or the left CTU, or a reference sample line from the left CTU.

FIGS. 11A-11D illustrate examples of reference sample memory usage for the IBC-based compensation and boundary padding for an unavailable reference area when three sets of (e.g., 64×64 sized) reference sample memory blocks are used and when a quadtree or horizontal binary tree split at a 128×128 level is used. FIGS. 11E-11H illustrate examples of reference sample memory usage for the IBC-based compensation and boundary padding for the unavailable reference area when three sets of (e.g., 64×64 sized) reference sample memory blocks are used and when a vertical binary tree split at a 128×128 level is used. One of the three sets of (e.g., 64×64 sized) reference sample memory blocks may be used to store reconstructed samples of the current (e.g., 64×64 sized) coding region, and the other two sets of (e.g., 64×64 sized) reference sample memory blocks may be used to store reconstructed samples of previously decoded 64×64 coding regions.

In FIGS. 11A-11H, each of the areas with vertical strips is a 64×64 region where the current coding block is located. Each of the shaded areas is a previously decoded and reconstructed area. The areas surrounded by a dotted rectangle include the reconstructed areas and the 64×64 current coding regions. The references samples in the areas surrounded by a dotted rectangle are stored in a reference sample memory. Padding of CTU boundary reference samples may be applied to the reconstructed but unavailable reference areas (areas with dotted arrows) so that the search range can always include at least the right half of the left CTU and the reconstructed areas in the current CTU.

Figures 11A, 11B:
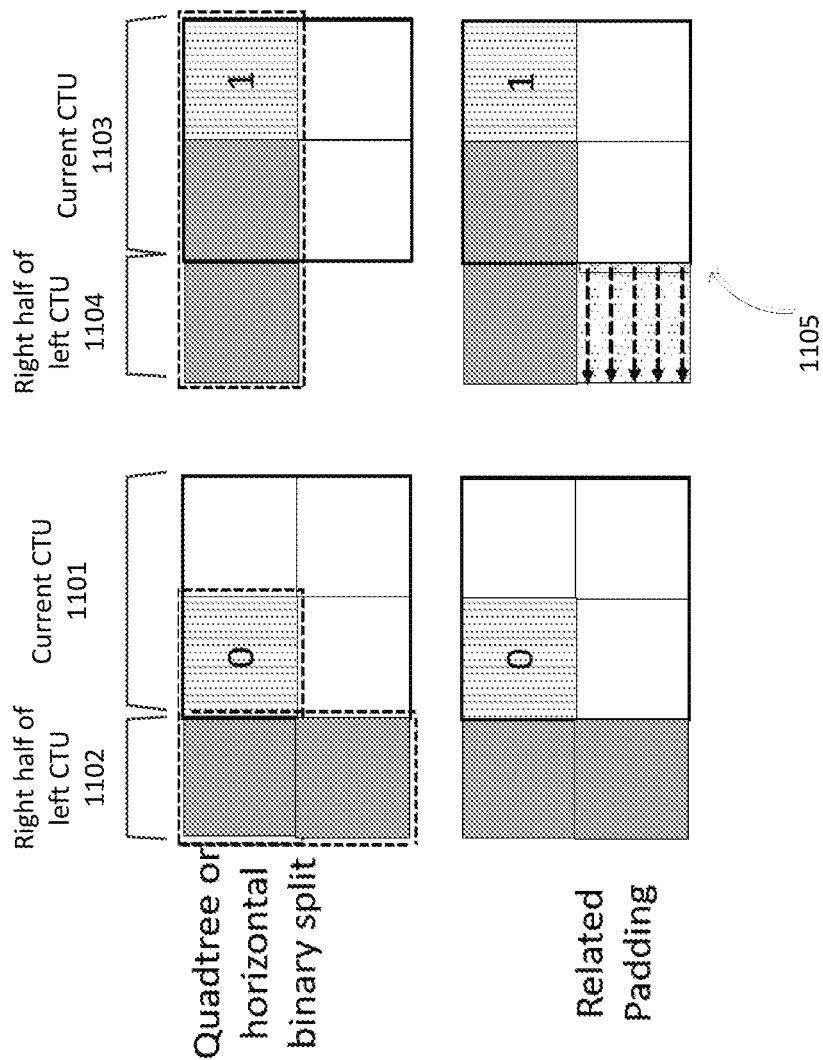
Figures 11E, 11F:
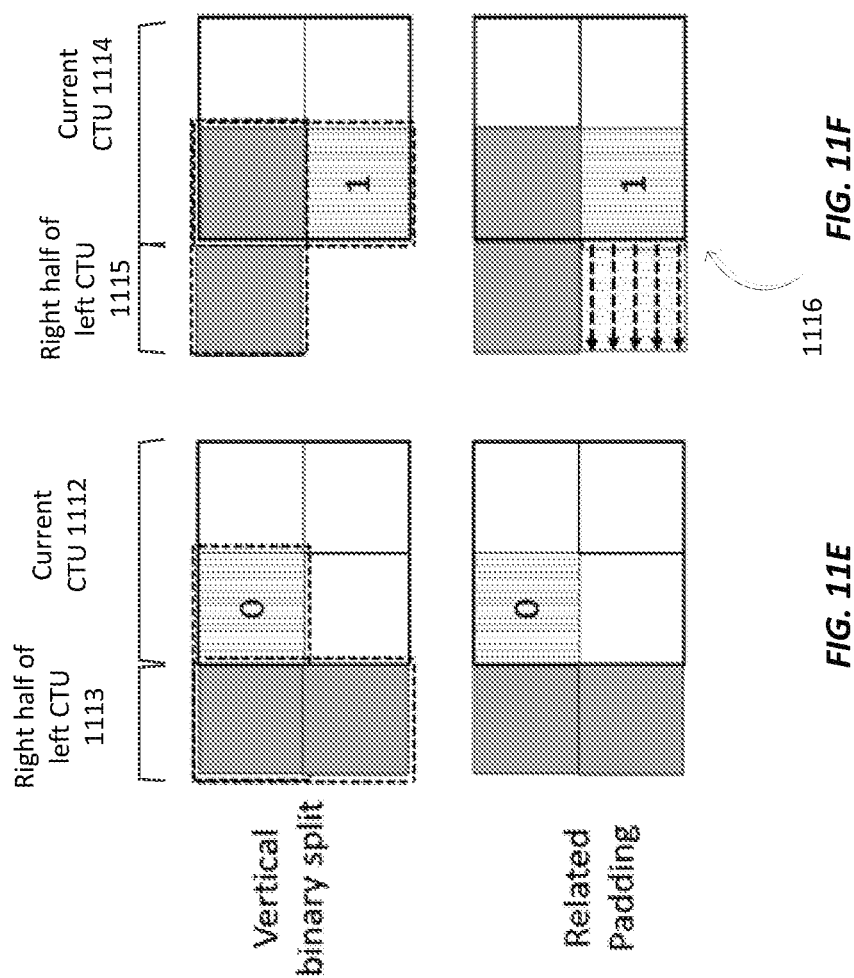

For example, as shown in FIGS. 11A and 11E, when the current coding block is at a top-left block of the current CTU (1101, 1112), the search range may include a top-right block and a bottom-right block of the right half of the left CTU (1102, 1113). The search range may further include reconstructed areas in the current CTU (1102, 1113) in some embodiments. Padding may not need to be performed in this example because the reconstructed reference samples in the right half of the left CTU (1102, 1113) are still stored in the reference sample memory and block vectors that point to the right half of the left CTU (1102 and 1113) are valid.

In FIG. 11B, when a quadtree or horizontal binary tree split (e.g., at a 128×128 level) is used and when the current coding block is at a top-right block of the current CTU, the search range may include a top-left block of the current CTU (1103) and a top-right block of the right half of the left CTU (1104). The search range may further include reconstructed areas in the current CTU (1103) in some embodiments. A bottom-right block of the right half of the left CTU (1104) may not be available due to the size of the reference sample memory. In some examples, horizontal padding may be used to copy the pixels values of a reference sample line (1105) from the right half of the left CTU (1104) that is nearest to the current CTU (1103) to the bottom-right block of the right half of the left CTU (1104). The padded pixel values may be stored in a memory different from the reference sample memory. The memory may be used for intra prediction of the coding blocks near the boundary of the current CTU (1103). Therefore, after the padding, the search range for the current coding block in the current CTU (1103) may include the right half of the left CTU (1104) and the reconstructed areas of the current CTU (1103).

In FIG. 11C, when a quadtree or horizontal binary tree split (e.g., at a 128×128 level) is used and when the current coding block is at a bottom-left block of the current CTU (1106), the search range may include a top-left block and a top-right block of the current CTU (1106). The search range may further include reconstructed areas in the current CTU (1106) in some embodiments. A top-right block and a bottom-right block of the right half of the left CTU (1107) may not be available due to the size of the reference sample memory. In some examples, horizontal padding may be used to copy the pixels values of a reference sample line (1108) from the right half of the left CTU (1107) that is nearest to the current CTU (1106) to the top-right block and the bottom-right block of the right half of the left CTU (1107). The padded pixel values may be stored in a memory different from the reference sample memory. The memory may be used for intra prediction of the coding blocks near the boundary of the current CTU (1107). Therefore, after the padding, the search range for the current coding block in current CTU (1107) may include the right half of the left CTU (1107) and the reconstructed areas of the current CTU (1107).

In FIG. 11F, when a vertical binary tree split (e.g., at a 128×128 level) is used and when the current coding block is at a bottom-left block of the current CTU (1114), the search range may include a top-left block of the current CTU (1114) and a top-right block of the right half of the left CTU (1115). The search range may further include reconstructed areas in the current CTU (1114) in some embodiments. A bottom-right block of the right half of the left CTU (1115) may not be available due to the size of the reference sample memory. In some examples, horizontal padding may be used to copy the pixels values of a reference sample line (1116) from the right half of the left CTU (1115) that is nearest to the current CTU (1114) to the bottom-right block of the left CTU (1115). The padded pixel values may be stored in a memory different from the reference sample memory. The memory may be used for intra prediction of the coding blocks near the boundary of the current CTU (1114). Therefore, after the padding, the search range for the current coding block in the current CTU (1114) may be the right half of the left CTU (1115) and the reconstructed areas of current CTU (1114).

In FIG. 11G, when a vertical binary tree split (e.g., at a 128×128 level) is used and when the current coding block is at a top-right block of the current CTU (1117), the search range may include a top-left block and a bottom-left block of the current CTU (1117). The search range may further include reconstructed areas in the current CTU (1117) in some embodiments. A top-right block and a bottom-right block of the right half of the left CTU (1118) may not be available due to the size of the reference sample memory. In some examples, horizontal padding may be used to copy the pixels values of a reference sample line (1119) from the right half of the left CTU (1118) that is nearest to the current CTU (1117) to the top-left block and the bottom-right block of the right half of the left CTU (1118). The padded pixel values may be stored in a memory different from the reference sample memory. The memory may be used for intra prediction of the coding blocks near the boundary of the current CTU (1117). Therefore, after the padding, the search range for the current coding block in the current CTU (1117) may include the right half of the left CTU (1118) and the reconstructed areas of the current CTU (1117).

In FIGS. 11D and 11H, when the current coding block is at a bottom-right block of the current CTU (1109, 1120), the search range may include a top-right block and a bottom-left block of the current CTU (1109, 1120). The search range may further include reconstructed areas in the current CTU (1109, 1120) in some embodiments. A top-left block of the current CTU (1109, 1120), and a top-right block and a bottom-right block of the right half of the left CTU (1110, 1121) due to the size of the reference sample memory. In some examples, horizontal padding may be used to copy the pixels values of a reference sample line (1111, 1122) from the right half of the left CTU (1110, 1121) that is nearest to the current CTU (1109,1120) to the top-left block of the current CTU (1109, 1120), and the top-right block and the bottom-right block of the right half of the left CTU (1110, 1121). The padded pixel values may be stored in a memory different from the reference sample memory. The memory may be used for intra prediction of the coding blocks near the boundary of the current CTU (1109, 1120). Therefore, after the padding, the search range for the current coding block in the current CTU (1109, 1120) may include the right half of the left CTU (1110, 1121) and the reconstructed areas of current CTU (1109, 1120).

According to an embodiment of the present disclosure, FIGS. 12A-12D describe an example of reference sample memory usage for the IBC-based compensation and boundary padding for the unavailable reference area when two sets of (e.g., 64×64 sized) reference sample memory blocks are used and when a quadtree or horizontal binary tree split (e.g., at a 128×128 level) is used. FIGS. 12E-12H describe an example of reference sample memory usage for the IBC-based compensation and boundary padding for the unavailable reference area when two sets of (e.g., 64×64 sized) reference sample memory blocks are used and when vertical binary tree split (e.g., at a 128×128 level) is used. One of the two sets of reference sample memory blocks may be used to store reconstructed samples of the current coding region, and the other set of reference sample memory block may be used to store reconstructed samples of a previously decoded coding region.

In FIGS. 12A-12H, each of the areas with vertical stripes is a region (e.g., 64×64 region) where the current coding block is located. Each of the shaded areas is a previously decoded and reconstructed area. The areas surrounded by a dotted rectangle include the reconstructed areas and the current coding region (e.g., 64×64 current coding region). The references samples in the areas surrounded by the dotted rectangle are stored in the reference sample memory. Padding of CTU boundary reference samples may be applied to the reconstructed but unavailable areas (areas with dotted arrows) so that the search range can always include the right half of a left CTU of the current CTU and the reconstructed areas in the current CTU. The left CTU may be adjacent to the current CTU.

Figures 12A, 12B:
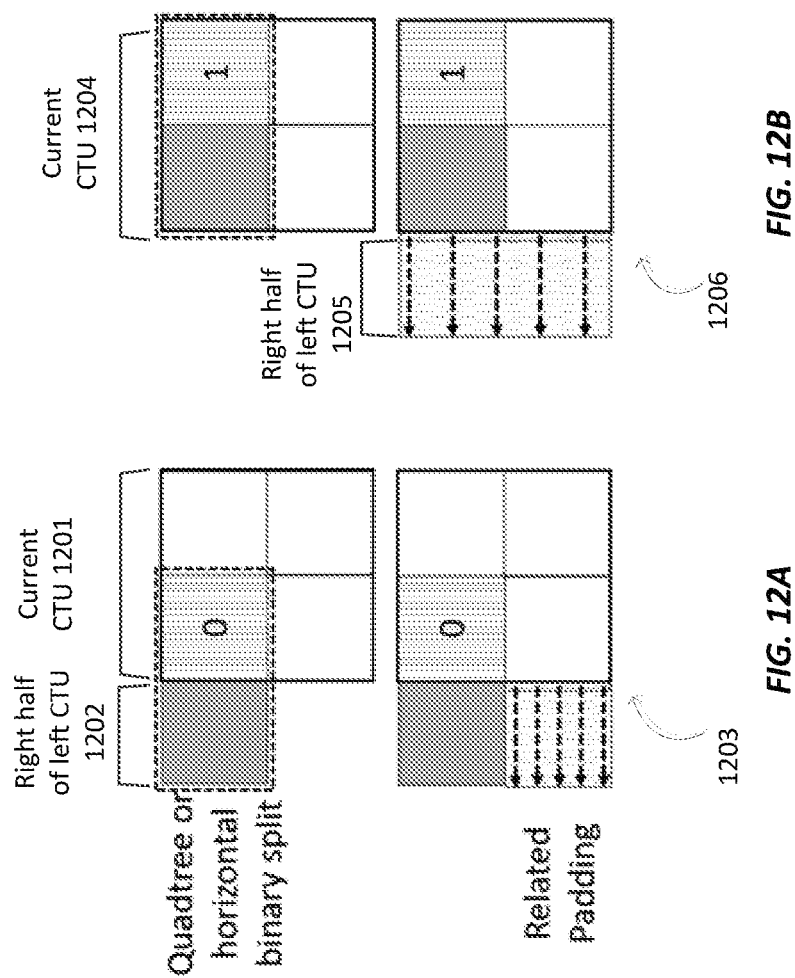
Figures 12E, 12F:
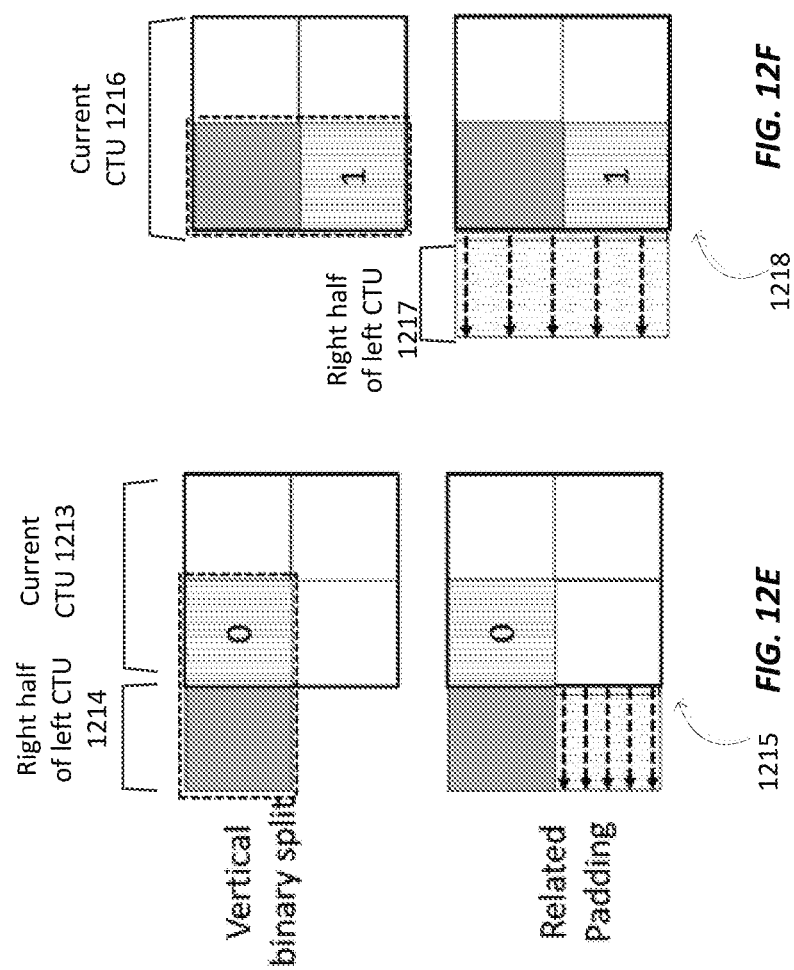

For example, as shown in FIGS. 12A and 12E, when the current coding block is at a top-left block of the current CTU (1201, 1213), the search range may include a top-right block of the right half of the left CTU (1202, 1214). The search range may further include reconstructed areas in the current CTU (1201, 1213) in some embodiments. A bottom-right block of the right half of the left CTU (1202, 1214) may not be available due to the size of the reference sample memory. In some examples, horizontal padding may be used to copy the pixels values of a reference sample line (1203, 1215) from the right half of the left CTU (1202, 1214) that is nearest to the current CTU (1201, 1213) to the bottom-right block of the right half of the left CTU (1202, 1214). The padded pixel values may be stored in a memory different from the reference sample memory. The memory may be used for intra prediction of the coding blocks near the boundary of the current CTU (1201, 1213). Therefore, after the padding, the search range for the current coding block in the current CTU (1201, 1213) may include the right half of the left CTU (1202, 1214) and the reconstructed areas of the current CTU (1201, 1213).

In FIG. 12B, when a quadtree or horizontal binary tree split (e.g., at a 128×128 level) is used and when the current coding block is at a top-right block of the current CTU (1204), the search range may include a top-left block of the current CTU (1204). The search range may further include reconstructed areas in the current CTU (1204) in some embodiments. A top-right block and a bottom-right block of the right half of the left CTU (1205) may not be available due to the size of the reference sample memory. In some examples, horizontal padding may be used to copy the pixels values of a reference sample line (1206) from the right half of the left CTU (1205) that is nearest to the current CTU (1204) to the top-right block and the bottom-right block of the right half of the left CTU (1205). The padded pixel values may be stored in a memory different from the reference sample memory. The memory may be used for intra prediction of the coding blocks near the boundary of the current CTU (1204). Therefore, after the padding, the search range for the current coding block in the current CTU (1204) may include the right half of the left CTU (1205) and the reconstructed areas of the current CTU (1204).

In FIG. 12C, when a quadtree or horizontal binary tree split (e.g., at a 128×128 level) is used and when the current coding block is at a bottom-left block of the current CTU (1207), the search range may include a top-right block of the current CTU (1207). The search range may further include reconstructed areas in the current CTU (1207) in some embodiments. A top-left block of the current CTU (1207), and a top-right block and the bottom-right block of the right half of the left CTU (1208) may not be available due to the size of the reference sample memory. In some examples, horizontal padding may be used to copy the pixels values of a reference sample line (1209) from the right half of the left CTU (1208) that is nearest to the current CTU (1207) to the top-left block of the current CTU (1207), and the top-right block and the bottom-right block of the right half of the left CTU (1208). The padded pixel values may be stored in a memory different from the reference sample memory. The memory may be used for intra prediction of the coding blocks near the boundary of the current CTU (1207). Therefore, after the padding, the search range for the current coding block in current CTU (1207) may include the right half of the left CTU (1208) and the reconstructed areas of the current CTU (1207).

In FIG. 12F, when a vertical binary tree split (e.g., at a 128×128 level) is used and when the current coding block is at a bottom-left block of the current CTU (1219), the search range may include a top-left block of the current CTU (1219). The search range may further include reconstructed areas in the current CTU (1219) in some embodiments. A top-right block and a bottom-right block of the right half of the left CTU (1220) may not be available due to the size of the reference sample memory. In some examples, horizontal padding may be used to copy the pixels values of a reference sample line (1221) from the right half of the left CTU (1220) that is nearest to the current CTU (1219) to the top-right block and the bottom-right block of the right half of the left CTU (1220). The padded pixel values may be stored in a memory different from the reference sample memory. The memory may be used for intra prediction of the coding blocks near the boundary of the current CTU (1219). Therefore, after the padding, the search range for the current coding block in the current CTU (1219) may include the right half of the left CTU (1220) and the reconstructed areas of current CTU (1219).

In FIG. 12G, when a vertical binary tree split (e.g., at a 128×128 level) is used and when the current coding block is at a top-right block of the current CTU (1219), the search range may include a top-left block of the current CTU (1219). The search range may further include reconstructed areas in the current CTU (1219) in some embodiments. A bottom-left block of the current CTU (1219), and a top-right block and a bottom-right block of the right half of the left CTU (1220) may not be available due to the size of the reference sample memory. In some examples, horizontal padding may be used to copy the pixels values of a reference sample line (1221) from the right half of the left CTU (1220) that is nearest to the current CTU (1219) to the bottom-left block of the current CTU (1219), and the top-right block and the bottom-right block of the left CTU (1220). The padded pixel values may be stored in a memory different from the reference sample memory. The memory may be used for intra prediction of the coding blocks near the boundary of the current CTU (1219). Therefore, after the padding, the search range for the current coding block in the current CTU (1219) may include the right half of the left CTU (1220) and the reconstructed areas of the current CTU (1219).

In FIGS. 12D and 12H, when the current coding block is at the bottom-right block of the current CTU (1210, 1222), the search range may include a top-right block of the current CTU (1210, 1222). The search range may further include reconstructed areas in the current CTU (1210, 1222) in some embodiments. A top-left block and a bottom-left of the current CTU (1210, 1222), and a top-right block and a bottom-right block of the right half of the left CTU (1211, 1223) may not be available due to the size of the reference sample memory. In some examples, horizontal padding may be used to copy the pixels values of a reference sample line (1212, 1224) from the right half of the left CTU (1211, 1223) that is nearest to the current CTU (1210, 1222) to the top-left block and the bottom-left of the current CTU (1210, 1222), and the top-right block and the bottom-right block of the right half of the left CTU (1211, 1223). The padded pixel values may be stored in a memory different from the reference sample memory. The memory may be used for intra prediction of the coding blocks near the boundary of the current CTU (1210, 1222). Therefore, after the padding, the search range for the current coding block in the current CTU (1210, 1222) may include the right half of the left CTU (1211, 1223) and the reconstructed areas of current CTU (1210, 1222).

One or a combination of horizontal padding from reconstructed samples at a rightmost column of a left CTU, or vertical padding from reconstructed samples at a bottommost row of a top CTU may be used to fill the unavailable reference area for the IBC-based compensation. In some examples, vertical padding is always used, as shown in FIGS. 10A-10H. In other examples, horizontal padding is always used, as shown in FIGS. 11B-11D, FIGS. 11F-11H, and FIGS. 12A-12H.

In an embodiment of the present disclosure, both vertical and horizontal padding may be used in decoding a current block in a current CTU using the IBC-based compensation. For example, in FIGS. 10C and 10D, when a quadtree or horizontal split (e.g., at a 128×128 level) is used, reconstructed samples in the top-right 64×64 block of the left CTU may not be available for reference. The top-right 64×64 block of the left CTU may be padded from a reference sample line in a top CTU. Alternatively, the top-right 64×64 block of the left CTU may be padded from a reference sample line at the rightmost column of left CTU. An average or weighted average of the reference sample lines of different CTUs can be used for padding in other embodiments. Similar examples may apply to other reconstructed but unavailable areas.

In an embodiment of the present disclosure, aspects of the present disclosure provide that the reference blocks of a current CTU may come from the same region (e.g., 64×64 region) in the picture.

In an embodiment, all the block vectors in a current CTU may point to only reference blocks that are available without padding. In other words, all of the reference samples of the reference blocks that are pointed to by block vectors are stored in a reference sample memory. Alternatively, all the block vectors in the current CTU may point to only reference blocks that are padded. In other words, all of the reference samples of the reference blocks that are pointed to by block vectors are stored in a memory (e.g., a temporary memory) different from the reference sample memory. In an embodiment, the encoder may be required to generate a bitstream with BV values such that a reference block is either reconstructed entirely from the reference sample memory (e.g., the reference block is fully available without any padding) or fully from padded samples. If the BV values are not valid (e.g., not within a certain range), then the encoder fails to conform to this requirement. By applying this constraint/requirement, at the decoder side, the reconstruction of a prediction block can be easier by accessing only the reference sample memory or only the temporary memory instead of accessing both the reference sample memory and the temporary memory.

According to aspects of the present disclosure, vertical and horizontal padding may be used together to decode a current block in a current CTU using the IBC-based compensation. Vertical and horizontal padding for a reference coding region may be used based on distance to a CTU boundary, such as (i) a first distance between the reference coding region and a reference sample line above the current CTU and (ii) a second distance between the reference coding region and another reference sample line to the left of the current CTU. In one embodiment, a padding method which uses spatially closer pixel values for the pixels to be padded is used. For example, if the first distance is shorter than the second distance, then vertical padding using the reference sample line above the current CTU may be used for the reference coding region. If the first distance is longer than the second distance, then horizontal padding using the other reference sample line to the left of the current CTU may be used for the reference coding region. One of the horizontal padding and vertical padding can be selected by default when the first and second distances are equal to each other.

In one embodiment, when the first distance is the same as the second distance, vertical padding may be always used. In another embodiment, horizontal padding may be always used when the first distance is the same as the second distance.

Figures 13A, 13B, 13C:
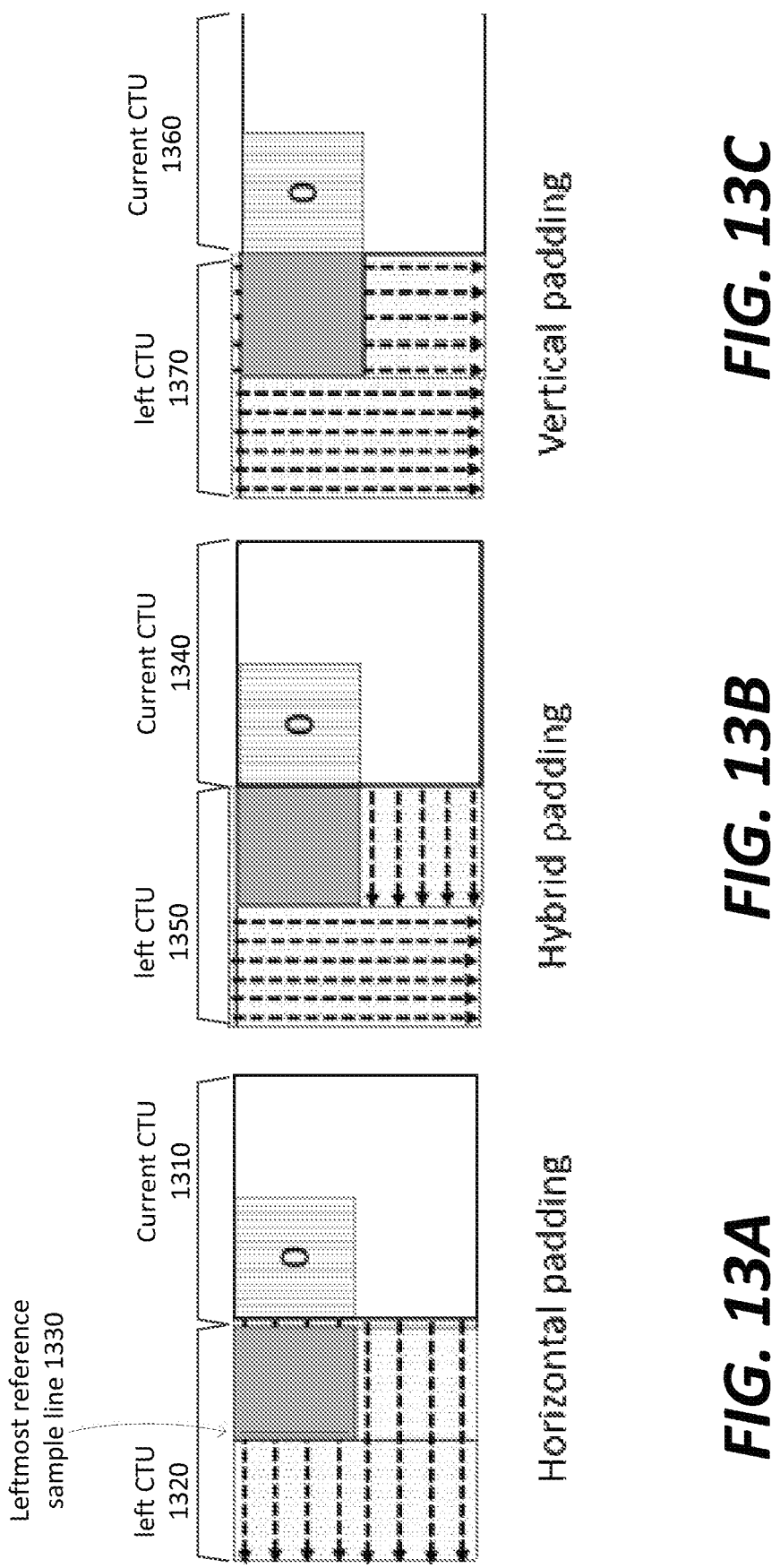
FIG. 13A shows an example of horizontal padding when decoding a current coding block in a top-left block of a current CTU in accordance with an embodiment.
FIG. 13B shows an example of hybrid padding when decoding a current coding block in a top-left block of a current CTU in accordance with an embodiment.
FIG. 13C shows an example of vertical padding when decoding a current coding block in a top-left block of a current CTU in accordance with an embodiment.

In one embodiment of the present disclosure, padding can be implemented by using the boundary pixels of an edge of the available reference range, instead of using the reference sample line at the rightmost column in a left CTU or another reference sample line at the bottommost row in a top CTU. For example, FIG. 13A shows padding the top left region (e.g., a 64×64 region) of the left CTU (1320) using the rightmost column line of the left CTU (1320). However, a reference sample line in the reconstructed and available area (e.g., the leftmost reference sample line (1330) of the top-right 64×64 block of the left CTU (1320)) may be used to extend vertically to pad the top-left 64×64 block of the left CTU (1320).

In one embodiment of the present disclosure, the padding range can be extended to the entire left CTU, or other different sizes when the available reference range includes only a portion of the left CTU. For example, the left half (left 64×128) part of the left CTU can be padded by horizontal padding, vertical padding, or a combination of horizontal padding and vertical padding for examples described in FIGS. 12A-12H. Specifically, as shown in FIG. 13A, when the current coding block is located in the top-left block of the current CTU (1310) and the search range only includes the top-right block of the left CTU (1320) and, in some embodiments, the current coding block of the current CTU (1310), the top-left block, the bottom-left block, and the bottom-right block of the left CTU (1320) can be padded horizontally using a reference sample line at the rightmost column of the left CTU (1320).

FIG. 13B shows padding the top-left block, the bottom-left block, and the bottom-right block of the left CTU (1350) by a hybrid padding (i.e., a combination of horizontal and vertical padding) when decoding a current coding block in a top-left block of the current CTU (1340) and when the search range only includes the top-right block of the left CTU (1350) and, in some embodiments, the current coding block of the current CTU (1340). In FIG. 13B, the top-left block and the bottom-left block of the left CTU (1350) may be padded vertically using a reference sample line on top of the left CTU (1350) and the bottom-right block of the left CTU (1350) may be padded horizontally using another reference sample line (e.g., a reference sample line at the rightmost column of the left CTU (1350)).

FIG. 13C shows padding the top-left block, the bottom-left block, and the bottom-right block of the left CTU (1370) by vertical padding using a reference sample line on top of the left CTU (1370) when decoding a current coding block in a top-left block of the current CTU (1360) and when the search range only includes the top-right block of the left CTU (1370) and, in some embodiments, the current coding block of the current CTU (1360).

Figure 14:
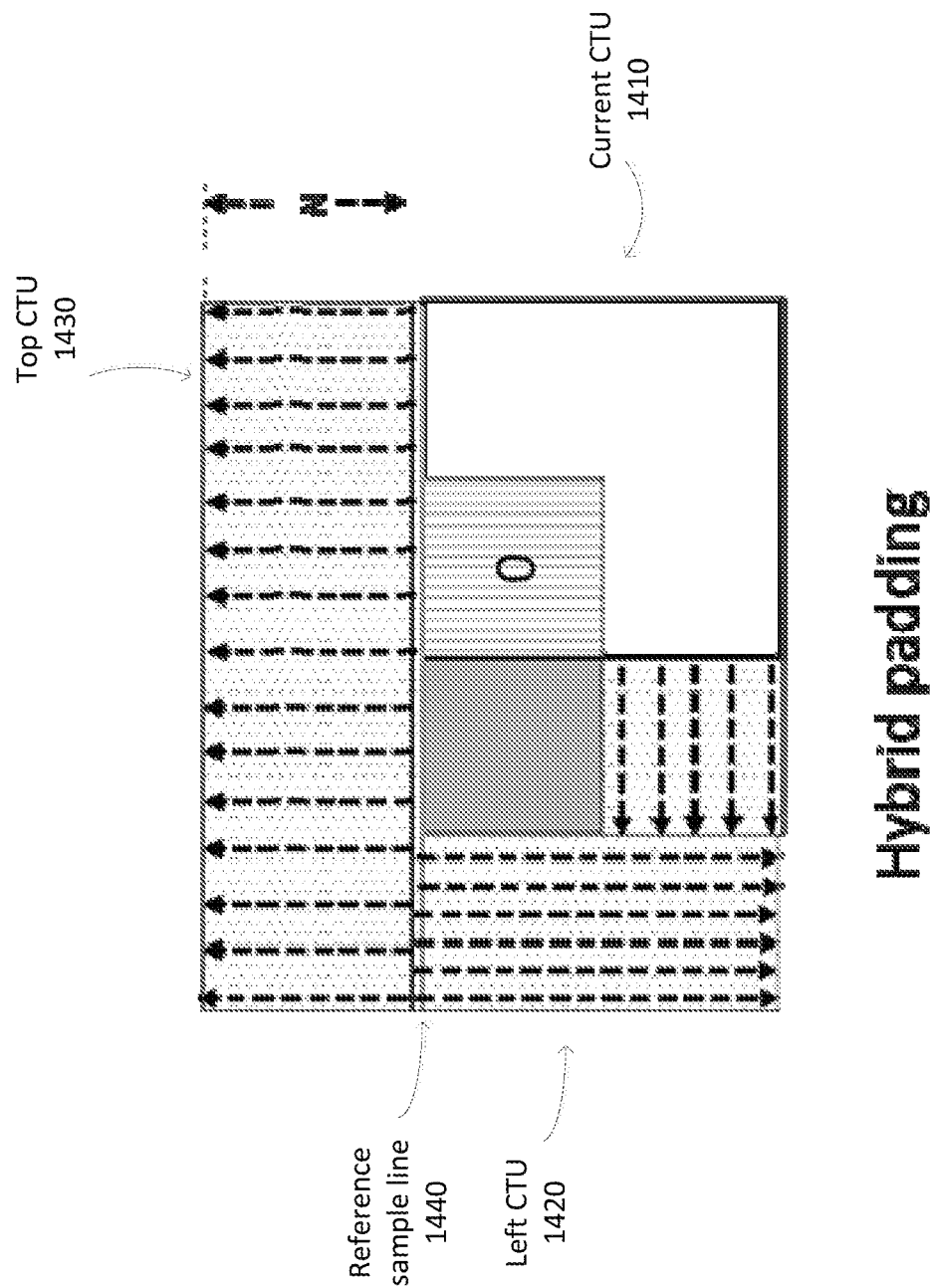
FIG. 14 shows an example of extending a reference area to a top CTU by N rows in accordance with an embodiment.

The padding range can be extended to regions of another CTU (e.g., in a top CTU (1430)), as shown in FIG. 14. The top CTU may be above a current CTU (1410) and a left CTU (1420). In FIG. 14, when decoding a current coding block in a top-left block of the current CTU (1410), pixel values of the reference sample line (1440) in the top CTU (1430) can be extended to the left half region of the left CTU (1420). Further, pixel values of the reference sample line (1440) in the top CTU (1430) can be extended to N rows in the top CTU (1430). N may be a positive integer.

Figure 15:
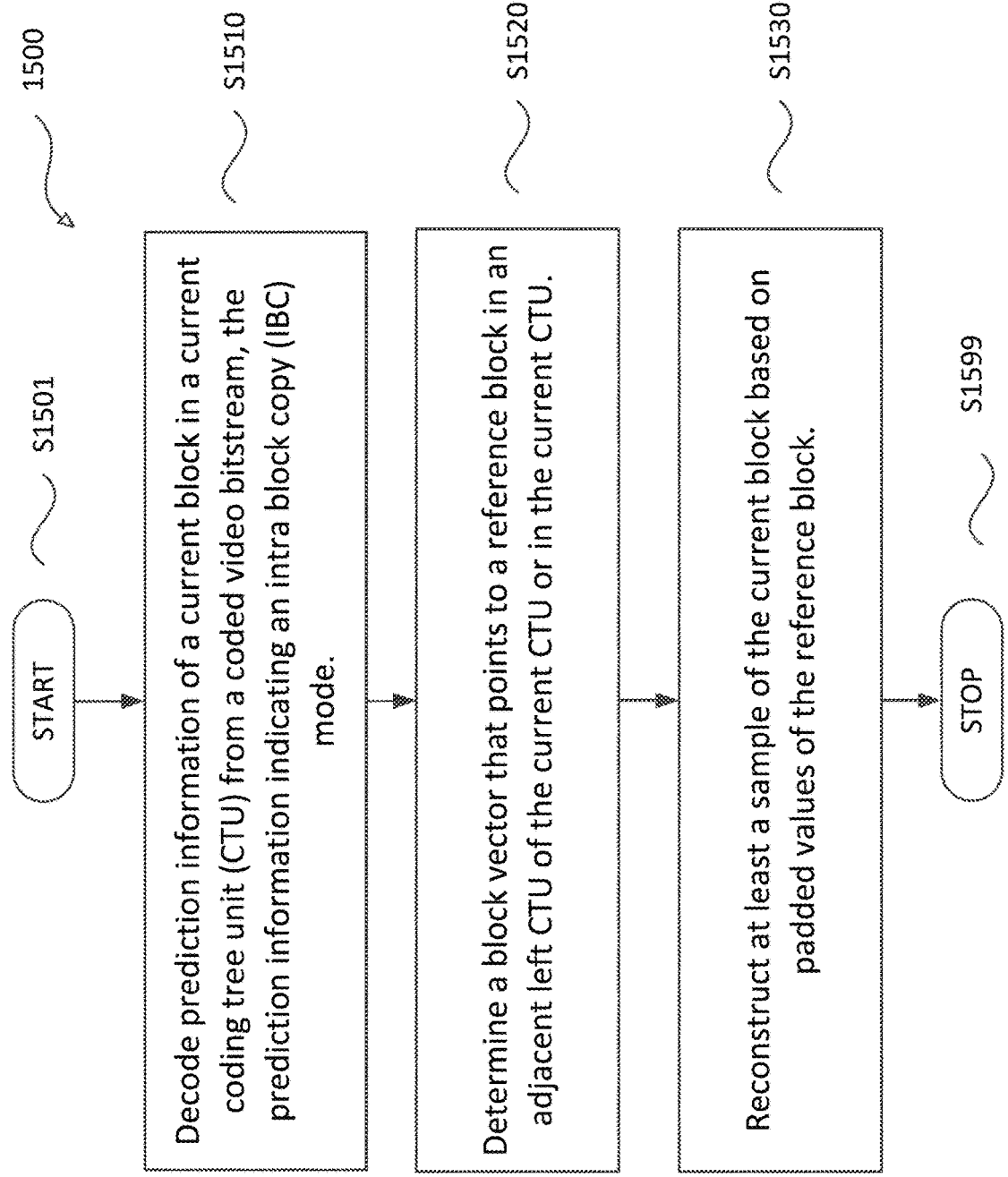
FIG. 15 shows a flow chart outlining a decoding process (S1500) according to an embodiment of the disclosure.

FIG. 15 shows a flow chart outlining a decoding process (1500) according to an embodiment of the disclosure. The process (1500) can be used to decode a block (i.e., a current coding block) in a current CTU of a picture using the IBC-based compensation. In some embodiments, one or more operations are performed before or after process (1500), and some of the operations illustrated in FIG. 15 may be reordered or omitted. In various embodiments, the process (1500) is executed by processing circuitry, such as the processing circuitry in the terminal devices (210), (220), (230), and (240), the processing circuitry that performs functions of the video decoder (310), (410), or (710), and the like. In some embodiments, the process (1500) is implemented by software instructions, thus when the processing circuitry executes the software instructions, the processing circuitry performs the process (1500). The process starts at (S1501) and proceeds to (S1510).

At (S1510), prediction information of a current block in a current coding tree unit (CTU) from a coded video bitstream is decoded. The prediction information indicates an intra block copy (IBC) mode.

At (S1520), padded values of a reference block are determined based on a block vector that points to the reference block. The padded values of the reference block are copied from a reference sample line. In some examples, the reference samples of the reference block may not be stored in a reference sample memory. The reference sample memory may only store two sets, three sets, or four sets of 64×64 luma samples and corresponding chroma samples. When the reference samples of reference block is not stored in the reference sample memory, the reference block may be padded using a reference sample line in the left CTU and/or a top CTU. Therefore, the block vector can be valid even when the block vector points to an unavailable reference block.

At (S1530), at least a sample of the current block is reconstructed based on padded values of the reference block. When reference samples of the reference block are not stored in the reference sample memory, the reference block may be padded using a reference sample line in the left CTU or a top CTU. The padded values may be stored in a memory that is different from the reference sample memory. Therefore, at least a sample of the current block may be reconstructed based on padded values of the reference block. After (S1530), the process proceeds to (S1599) and terminates.

V. Computer System

The techniques described above, can be implemented as computer software using computer-readable instructions and physically stored in one or more computer-readable media. For example, FIG. 16 shows a computer system (1600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 16:
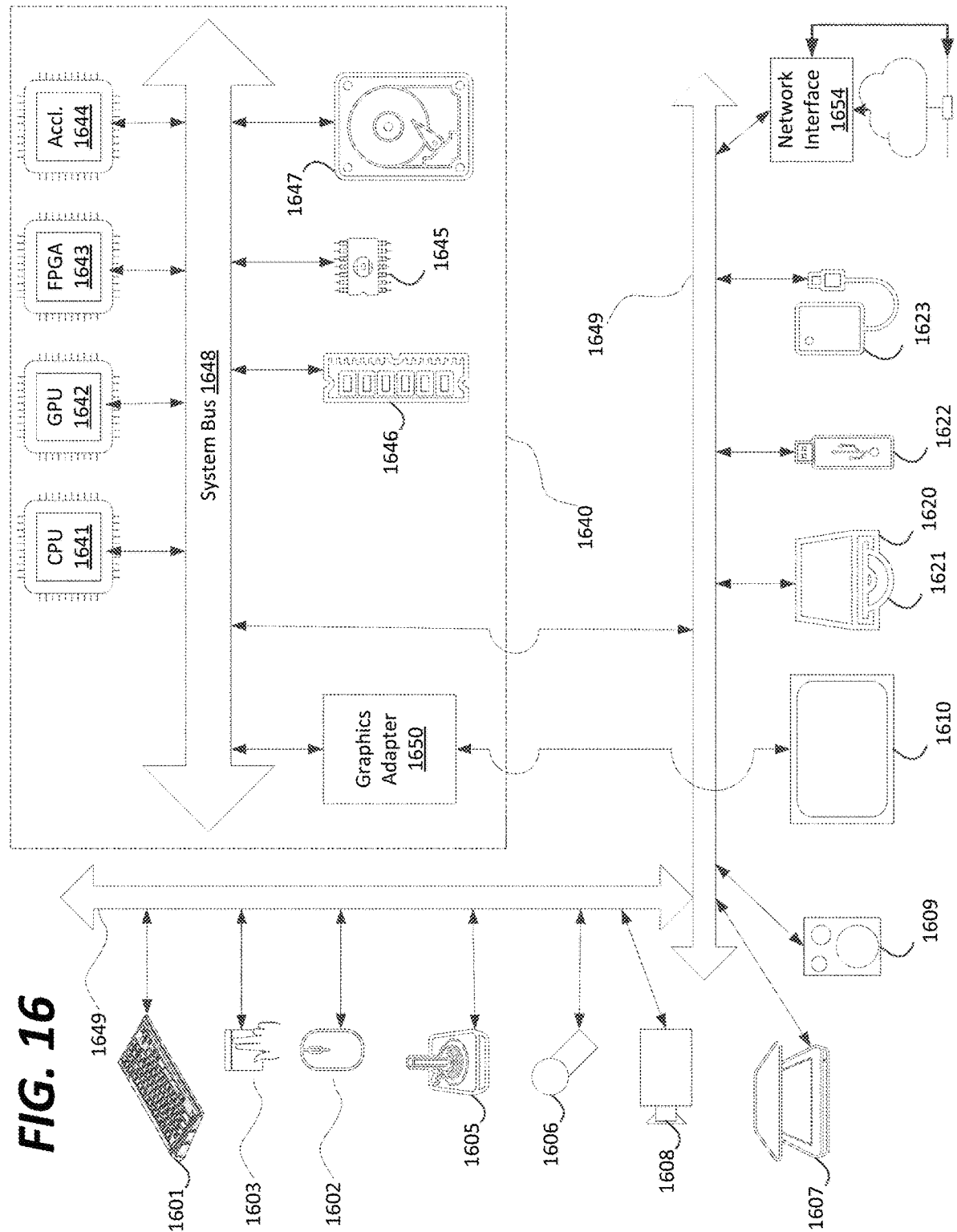
FIG. 16 is a schematic illustration of a computer system in accordance with an embodiment.

The components shown in FIG. 16 for computer system (1600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1600).

Computer system (1600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1601), mouse (1602), trackpad (1603), touch screen (1610), data-glove (not shown), joystick (1605), microphone (1606), scanner (1607), camera (1608).

Computer system (1600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1610), data-glove (not shown), or joystick (1605), but there can also be tactile feedback devices that do not serve as input devices), audio output devices (such as: speakers (1609), headphones (not depicted)), visual output devices (such as screens (1610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1600) can also include human accessible storage devices and their associated media such as optical media including CD/DVD ROM/RW (1620) with CD/DVD or the like media (1621), thumb-drive (1622), removable hard drive or solid state drive (1623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1600) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1649) (such as, for example USB ports of the computer system (1600)); others are commonly integrated into the core of the computer system (1600) by attachment to a system bus as described below (for example Ethernet interface into a PC computer system or cellular network interface into a smartphone computer system). Using any of these networks, computer system (1600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1640) of the computer system (1600).

The core (1640) can include one or more Central Processing Units (CPU) (1641), Graphics Processing Units (GPU) (1642), specialized programmable processing units in the form of Field Programmable Gate Areas (FPGA) (1643), hardware accelerators for certain tasks (1644), and so forth. These devices, along with Read-only memory (ROM) (1645), Random-access memory (1646), internal mass storage such as internal non-user accessible hard drives, SSDs, and the like (1647), may be connected through a system bus (1648). In some computer systems, the system bus (1648) can be accessible in the form of one or more physical plugs to enable extensions by additional CPUs, GPU, and the like. The peripheral devices can be attached either directly to the core's system bus (1648), or through a peripheral bus (1649). Architectures for a peripheral bus include PCI, USB, and the like.

CPUs (1641), GPUs (1642), FPGAs (1643), and accelerators (1644) can execute certain instructions that, in combination, can make up the aforementioned computer code. That computer code can be stored in ROM (1645) or RAM (1646). Transitional data can be also be stored in RAM (1646), whereas permanent data can be stored for example, in the internal mass storage (1647). Fast storage and retrieve to any of the memory devices can be enabled through the use of cache memory, that can be closely associated with one or more CPU (1641), GPU (1642), mass storage (1647), ROM (1645), RAM (1646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1600), and specifically the core (1640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1640) that are of non-transitory nature, such as core-internal mass storage (1647) or ROM (1645). The software implementing various embodiments of the present disclosure can be stored in such devices and executed by core (1640). A computer-readable medium can include one or more memory devices or chips, according to particular needs. The software can cause the core (1640) and specifically the processors therein (including CPU, GPU, FPGA, and the like) to execute particular processes or particular parts of particular processes described herein, including defining data structures stored in RAM (1646) and modifying such data structures according to the processes defined by the software. In addition or as an alternative, the computer system can provide functionality as a result of logic hardwired or otherwise embodied in a circuit (for example: accelerator (1644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
IBC: Intra Block Copy
CPR: Current Picture Referencing
BV: Block Vector
AMVP: Advanced Motion Vector Prediction
HEVC SCC: HEVC Screen Content Coding
DPB: Decoded Picture Buffer
QT: Quaternary-Tree
BT: Binary-Tree
TT: Ternary-Tree
TL: top-left
TR: top-right
BL: bottom-left
BR: bottom-right While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video encoding in an encoder, the method comprising:
    determining which of a combination of vertical padding and horizontal padding is performed to determine padded values of a reference block in a neighboring left coding tree unit (CTU) included in a fixed search range of blocks in a current CTU;
    determining the padded values based on a block vector that points to the reference block and a position of a current block in the CTU, the padded values of the reference block being copied from at least one reference sample line according to the determination of which of the vertical padding and the horizontal padding is performed, availability of reference blocks in the fixed search range varying for each of the blocks in the current CTU; and
    reconstructing at least a sample of the current block based on one of (i) the padded values of the reference block and (ii) reconstructed samples of the reference block based on the availability of the reference block in the fixed search range,
    wherein the left CTU is padded using a combination of the vertical and the horizontal padding.

2. The method of claim 1, wherein
    the reconstructed samples of the reference block are not stored in a reference sample memory, and
    the padded values of the reference block are stored in a memory that is different from the reference sample memory.

3. The method of claim 1, wherein
    the current CTU is partitioned into a top-left coding region, a top-right coding region, a bottom-left coding region, and a bottom-right coding region, and
    the current block is in any one of the top-left coding region, the top-right coding region, the bottom-left coding region, and the bottom-right coding region of the current CTU.

4. The method of claim 1, wherein the reference block is padded vertically by the reference sample line above the current CTU or horizontally by the reference sample line to the left of the current CTU.

5. The method of claim 2, wherein
    based on a maximum size of the reference sample memory being limited to four sets of 64×64 luma samples and corresponding chroma samples,
    the reference sample memory stores reconstructed samples of a current 64×64 coding region and reconstructed samples of three 64×64 reference coding regions, each of the three 64×64 reference coding regions being either in one of the current CTU and the left CTU, and
    the three 64×64 reference coding regions do not include all the reconstructed samples of the reference block.

6. The method of claim 2, wherein
    the left CTU is partitioned into a top-left reference coding region, a top-right reference coding region, a bottom-left reference coding region, and a bottom-right reference coding region, and
    each of the reference coding regions in the left CTU including reconstructed samples that are not stored in the reference sample memory is padded by the reference sample line above the current CTU or to the left of the current CTU.

7. The method of claim 2, wherein
    the left CTU is partitioned into a top-left reference coding region, a top-right reference coding region, a bottom-left reference coding region, and a bottom-right reference coding region, and
    the reference block is included in the top-right reference coding region or the bottom-right reference coding region of the left CTU, or in the current CTU.

8. The method of claim 7, wherein based on a maximum size of the reference sample memory being limited to three sets of 64×64 luma samples and corresponding chroma samples,
    the reference sample memory stores reconstructed samples of a current 64×64 coding region and reconstructed samples of two 64×64 reference coding regions, each of the two 64×64 reference coding regions being either in one of the current CTU and the left CTU, and
    the two 64×64 reference coding regions do not include all the reconstructed samples of the reference block.

9. The method of claim 7, wherein each of the top-right reference coding region of the left CTU, the bottom-right reference coding region of the left CTU, and reference coding regions in the current CTU including reconstructed samples that are not stored in the reference sample memory is padded by the reference sample line above the current CTU or to the left of the current CTU.

10. The method of claim 7, wherein
    based on a maximum size of the reference sample memory being limited to two sets of 64×64 luma samples and corresponding chroma samples,
    the reference sample memory stores reconstructed samples of a current 64×64 coding region and reconstructed samples of one 64×64 reference coding region in one of the current CTU or the left CTU, and
    the 64×64 reference coding region includes all the reconstructed samples of the reference block.

11. The method of claim 10, wherein each of the top-right reference coding region of the left CTU, the bottom-right reference coding region of the left CTU, and reference coding regions in the current CTU including reconstructed samples that are not stored in the reference sample memory is padded by the reference sample line above the current CTU or to the left of the current CTU.

12. The method of claim 1, wherein
each of a plurality of reference coding regions of the current CTU and the left CTU are padded horizontally by a first reference sample line above the current CTU or vertically by a second reference sample line to the left of the current CTU based on (i) a first distance between each of the plurality of the reference coding regions and the first reference sample line above the current CTU and (ii) a second distance between each of the plurality of the reference coding regions and the second reference sample line to the left of the current CTU.

13. The method of claim 2, wherein
the reference block is padded by boundary pixels of a reconstructed reference block in one of the current CTU and the left CTU, and
reconstructed samples of the reconstructed reference block are stored in the reference sample memory.

14. An apparatus, comprising:
processing circuitry configured to
determine which of a combination of vertical padding and horizontal padding is performed to determine padded values of a reference block in a neighboring left coding tree unit (CTU) included in a fixed search range of blocks in a current CTU;
determine the padded values based on a block vector that points to the reference block and a position of a current block in the CTU, the padded values of the reference block being copied from at least one reference sample line according to the determination of which of the vertical padding and the horizontal padding is performed, availability of reference blocks in the fixed search range varying for each of the blocks in the current CTU; and
reconstruct at least a sample of the current block based on one of (i) the padded values of the reference block and (ii) reconstructed samples of the reference block based on the availability of the reference block in the fixed search range,
wherein the left CTU is padded using a combination of the vertical and the horizontal padding.

15. The apparatus according to claim 14, wherein
the reconstructed samples of the reference block are not stored in a reference sample memory, and
the padded values of the reference block are stored in a memory that is different from the reference sample memory.

16. The apparatus according to claim 14, wherein
the current CTU is partitioned into a top-left coding region, a top-right coding region, a bottom-left coding region, and a bottom-right coding region, and
the current block is in any one of the top-left coding region, the top-right coding region, the bottom-left coding region, and the bottom-right coding region of the current CTU.

17. The apparatus according to claim 14, wherein
the reference block is padded vertically by the reference sample line above the current CTU or horizontally by the reference sample line to the left of the current CTU.

18. The apparatus according to claim 15, wherein
based on a maximum size of the reference sample memory being limited to four sets of 64×64 luma samples and corresponding chroma samples,
the reference sample memory stores reconstructed samples of a current 64×64 coding region and reconstructed samples of three 64×64 reference coding regions, each of the three 64×64 reference coding regions being either in one of the current CTU and the left CTU, and
the three 64×64 reference coding regions do not include all the reconstructed samples of the reference block.

19. The apparatus according to claim 15, wherein
the left CTU is partitioned into a top-left reference coding region, a top-right reference coding region, a bottom-left reference coding region, and a bottom-right reference coding region, and
each of the reference coding regions in the left CTU including reconstructed samples that are not stored in the reference sample memory is padded by the reference sample line above the current CTU or to the left of the current CTU.

20. A non-transitory computer-readable medium storing instructions which when executed by a computer for video decoding cause the computer to perform:
determining which of a combination of vertical padding and horizontal padding is performed to determine padded values of a reference block in a neighboring left coding tree unit (CTU) included in a fixed search range of blocks in a current CTU;
determining the padded values based on a block vector that points to the reference block and a position of a current block in the CTU, the padded values of the reference block being copied from at least one reference sample line according to the determination of which of the vertical padding and the horizontal padding is performed, availability of reference blocks in the fixed search range varying for each of the blocks in the current CTU; and
reconstructing at least a sample of the current block based on one of (i) the padded values of the reference block and (ii) reconstructed samples of the reference block based on the availability of the reference block in the fixed search range,
wherein the left CTU is padded using a combination of the vertical and the horizontal padding.

* * * * *